(12) United States Patent
Haener et al.

(10) Patent No.: US 10,699,209 B2
(45) Date of Patent: Jun. 30, 2020

(54) QUANTUM CIRCUIT LIBRARIES FOR FLOATING-POINT ARITHMETIC

(71) Applicant: Microsoft Technology Licensing, LLC, Redmond, WA (US)

(72) Inventors: Thomas Haener, Bellevue, WA (US); Martin Roetteler, Woodinville, WA (US); Krysta Svore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/024,541

(22) Filed: Jun. 29, 2018

(65) Prior Publication Data

US 2019/0156242 A1    May 23, 2019

Related U.S. Application Data

(60) Provisional application No. 62/589,424, filed on Nov. 21, 2017.

(51) Int. Cl.
| | |
|---|---|
| *G06N 10/00* | (2019.01) |
| *G06F 7/487* | (2006.01) |
| *G06F 7/48* | (2006.01) |
| *H04L 9/08* | (2006.01) |
| *H03K 19/195* | (2006.01) |
| *G06F 7/485* | (2006.01) |

(52) U.S. Cl.
CPC ............. *G06N 10/00* (2019.01); *G06F 7/48* (2013.01); *G06F 7/485* (2013.01); *G06F 7/487* (2013.01); *G06F 7/4876* (2013.01); *H04L 9/0852* (2013.01); *H03K 19/195* (2013.01)

(58) Field of Classification Search
CPC ......... G06N 10/00; G06F 7/483; G06F 7/485; G06F 7/487; G06F 7/4876; G06F 17/5045
See application file for complete search history.

(56) References Cited

PUBLICATIONS

D. Wecker et al., LIQUi|>: A Software Design Architecture and Domain-Specific Language for Quantum Computing, arXiv:1402.4457v1 [quant-ph], 2014 (Year: 2014).*

(Continued)

*Primary Examiner* — Andrew Caldwell
*Assistant Examiner* — Emily E Larocque
(74) *Attorney, Agent, or Firm* — Klarquist Sparkman, LLP

(57) ABSTRACT

Quantum algorithms to solve practical problems in quantum chemistry, materials science, and matrix inversion often involve a significant amount of arithmetic operations. These arithmetic operations are to be carried out in a way that is amenable to the underlying fault-tolerant gate set, leading to an optimization problem to come close to the Pareto-optimal front between number of qubits and overall circuit size. In this disclosure, a quantum circuit library is provided for floating-point addition and multiplication. Circuits are presented that are automatically generated from classical Verilog implementations using synthesis tools and compared with hand-generated and hand-optimized circuits. Example circuits were constructed and tested using the software tools LIQUi|⟩ and RevKit.

17 Claims, 21 Drawing Sheets

(56) References Cited

PUBLICATIONS

T.D. Nguyen et al., A Resource-Efficient Design for a Reversible floating Point Adder in Quantum Computing, ACM Journal on Emerging Technologies in Computing Systems, vol. 11, No. 2, Article 13, 2014 (Year: 2014).*
M. Elhoushi, et al., Modeling a Quantum Processor using the QRAM Model, IEEE 2011 (Year: 2011).*
X. Liu et al., Chisel-Q: Designing Quantum Circuits with a Scala Embedded Language, IEEE 2013 (Year: 2013).*
A. Kamaraj, et al., Design of Reversible Logic based Single Precision Floating Point Multiplier for FFT, International Journal of Applied Engineering Research, ISSN 0973-4562, vol. 10, No. 1, pp. 157-162, 2015 (Year: 2015).*
M. Soeken et al., RevKit: A Toolkit for Reversible Circuit Design, Journal of multiple-valued logic and soft computing, 2010 (Year: 2010).*
J. Jain et al., Design and Development of Efficient Reversible Floating Point Arithmetic unit, 2015 Fifth International Conference on Communication Systems and Network Technologies, 2015 (Year: 2015).*
M. Amy et al., A meet-in-the-middle algorithm for fast synthesis of depth-optimal quantum circuits, arXiv:1206.0758v3 [quant-ph], 2013 (Year: 2013).*
A.V. AnanthaLakshmi et al., A novel power efficient 0.64-GFlops fused 32-bit reversible floating point arithmetic unit architecture for digital signal processing applications, Microprocessors and Microsystems 51, p. 366-385, Jan. 2017 (Year: 2017).*
M. Nachtigal, et al., Design of a Reversible Floating-Point Adder Architecture, 2011 11th IEEE International Conference on Nanotechnology, 2011 (Year: 2011).*
M. Soeken, et al., LUT-Based Hierarchical Reversible Logic Synthesis, IEE Transactions on Computer-Aided Design of Integrated Circuits and Systems, vol. 38, No. 9, Sep. 2019 (Year: 2019).*
Abdessaied et al., "Technology Mapping for Single Target Gate Based Circuits using Boolean Functional Decomposition," *Int'l Conf. on Reversible Computation*, pp. 219-232 (2015).
Babbush et al., "Exponentially more precise quantum simulation of fermions in second quantization," *New Journal of Physics*, vol. 18, pp. 1-17 (Mar. 2016).

Chen et al., "DAOmap: A Depth-Optimal Area Optimization Mapping Algorithm for FPGA Designs," *Int'l Conf. on Computer-Aided Design*, pp. 752-759 (2004).
Cong et al., "FlowMap: An Optimal Technology Mapping Algorithm for Delay Optimization in Lookup-Table based FPGA Designs," *IEEE Trans. on CAD of Integrated Circuits and Systems*, vol. 13, No. 1, pp. 1-12 (Jan. 1994).
Häner et al., "Factoring using 2n+2 qubits with toffoli based modular multiplication," arXiv:1611.07995v2, pp. 1-12 (Jun. 2017).
Harrow et al., "Quantum algorithm for linear systems of equations," *Physical Review Letters*, vol. 103, pp. 1-24 (Jun. 2009).
Jones, "Novel construction for the fault-tolerant Toffoli gate," arXiv:1212.5069v1, 5 pp. (Dec. 2012).
Nachtigal et al., "Design of a Reversible Floating-Point Adder Architecture," *IEEE Int'l Conf. on Nanotechnology*, pp. 451-456 (Aug. 2011).
Nguyen et al., "A resource-efficient design for a reversible floating point adder in quantum computing," *ACM Journal on Emerging Technologies in Computing Systems*, vol. 11, No. 2, 18 pp. (Nov. 2014).
Nguyen et al., "A Space-Efficient Design for a Reversible Floating Point Adder in Quantum Computing," arXiv:1306.3760, pp. 1-11 (Jun. 2013).
Nielsen et al., *Quantum Computation and Quantum Information*, Cambridge University Press, pp. 1-698 (2000).
Ray et al., "Mapping into LUT Structures," *Design, Automation and Test in Europe*, pp. 1579-1584 (2012).
Reiher et al., "Elucidating reaction mechanisms on quantum computers," arXiv:1605.03590, pp. 1-28 (May 2016).
Shor, "Algorithms for Quantum Computation: Discrete Logarithms and Factoring," *IEEE Symp. on Foundations of computer Science*, pp. 24-134 (1994).
Soeken et al., "Hierarchical reversible logic synthesis using LUTs," *Design Automation Conference*, pp. 1-6 (2017).
Steane, "Overhead and Noise Threshold of Fault-Tolerant Quantum Error Correction," *Physical Review A*, vol. 68, pp. 1-19 (Oct. 2003).
Steiger et al., "ProjectQ: An Open Source Software Framework for Quantum Computing," arXiv:1612.08091, pp. 1-13 (Jan. 2018).
Takahashi et al., "Quantum Addition Circuits and Unbounded Fan-Out," arXiv:0910.2530v1, pp. 1-17 (Oct. 2009).

* cited by examiner

1600 ⬥

```
Generate a reversible circuit for floating
point addition or multiplication operations
from given classical circuit descriptions
(e.g., automatically generated) - 1610
```

Figure 16

| Design | Width | Qubits | T-count | T-depth |
|---|---|---|---|---|
| Adder | 16 | 76 | 4,704 | 1,386 |
| Adder | 32 | 140 | 11,144 | 3,138 |
| Adder | 64 | 268 | 26,348 | 7,224 |
| Mult | 16 | 81 | 6,328 | 2,580 |
| Mult | 32 | 158 | 26,642 | 11,154 |
| Mult | 64 | 315 | 122,752 | 52,116 |

| Design | Width | Qubits | T-count | Runtime |
|--------|-------|--------|---------|---------|
| Adder | 16 | 76 | 112,059,924 | 143.49 |
| Adder | 16 | 100 | 40,915 | 2.28 |
| Adder | 32 | 239 | 79,415 | 24.22 |
| Adder | 64 | 538 | 165,509 | 2.05 |
| Mult | 16 | 81 | 3,195,745 | 3276.00 |
| Mult | 32 | 351 | 1,110,133 | 238.82 |
| Mult | 64 | 1675 | 7,709,931 | 3318.67 |

US 10,699,209 B2

QUANTUM CIRCUIT LIBRARIES FOR FLOATING-POINT ARITHMETIC

CROSS-REFERENCE TO RELATED APPLICATIONS

This application claims the benefit of U.S. Provisional Application No. 62/589,424 entitled "QUANTUM CIRCUIT LIBRARIES FOR FLOATING-POINT ARITHMETIC" and filed on Nov. 21, 2017, which is hereby incorporated herein by reference in its entirety.

FIELD

This application concerns quantum computing. In particular, this application involves a quantum circuit library (e.g., for providing a floating-point addition and multiplication).

SUMMARY

Quantum algorithms to solve practical problems in quantum chemistry, materials science, and matrix inversion often involve a significant amount of arithmetic operations. These arithmetic operations are to be carried out in a way that is amenable to the underlying fault-tolerant gate set, leading to an optimization problem to come close to the Pareto-optimal front between number of qubits and overall circuit size. In this disclosure, a quantum circuit library is provided for floating-point addition and multiplication. Circuits are presented that are automatically generated from classical Verilog implementations using synthesis tools and compared with hand-generated and hand-optimized circuits. Example circuits were constructed and tested using the software tools LIQUi|⟩ and RevKit.

More specifically, in this disclosure, a system and method to construct quantum floating point adders for a given target machine is disclosed. Example embodiments of the method rely on a set of available underlying libraries that provide the base components of the floating point operations of additions and multiplication that are constructed by the method. The underlying libraries include such operations as integer arithmetic and bit-operations such as shifting the contents of a quantum register and are expressed using a primitive gate set that is germane to the targeted physical or virtual machine. In a preferred embodiment, this primitive gate set is a fault-tolerant gate set such as the set of Clifford gates and a set of T-gates, both operating on a system of geometrically connected qubits. In another embodiment, the primitive gate set is a universal gate set for an anyonic quantum computer.

The available libraries in some examples include various fundamentally different ways of how to build floating point arithmetic, namely using (a) optimized circuits which could include optimizations that were found by a human by inspecting the problem and optimizing for the given gate set, (b) by using a set of circuits that were automatically generated using a synthesis tool, or (c) by using a combination of a set of human generated circuits which are then optimized using some automated rewriting tools. As one embodiment of (a), a way is disclosed to construct floating point addition, in twos complement encoding, by suitably arranging the two inputs to become comparable, then reducing to regular addition. In another embodiment, pertaining to (b), existing tools are used to produce quantum circuits from irreversible descriptions such as descriptions given in classical programming or hardware description languages.

The method uses one or a plurality of available optimization methods for selecting library functions by making decisions. Such decisions can include test-generation of the circuit and validation of the artifact against the available boundary decision, followed by iterative application of said process in case the validation criteria were not met. Such decisions can be made at compile time, however, if the underlying combined software/hardware stack supports it, could even be made at run-time, e.g., when the computation is executed on the targeted physical or virtual quantum machine.

BRIEF DESCRIPTION OF THE DRAWINGS

FIG. 16 is a flowchart showing a generalized example embodiment for implementing an embodiment of the disclosed technology.

FIG. 19 is a table of resource counts for hand-generated generated circuits.

DETAILED DESCRIPTION

I. General Considerations

Figure 1:
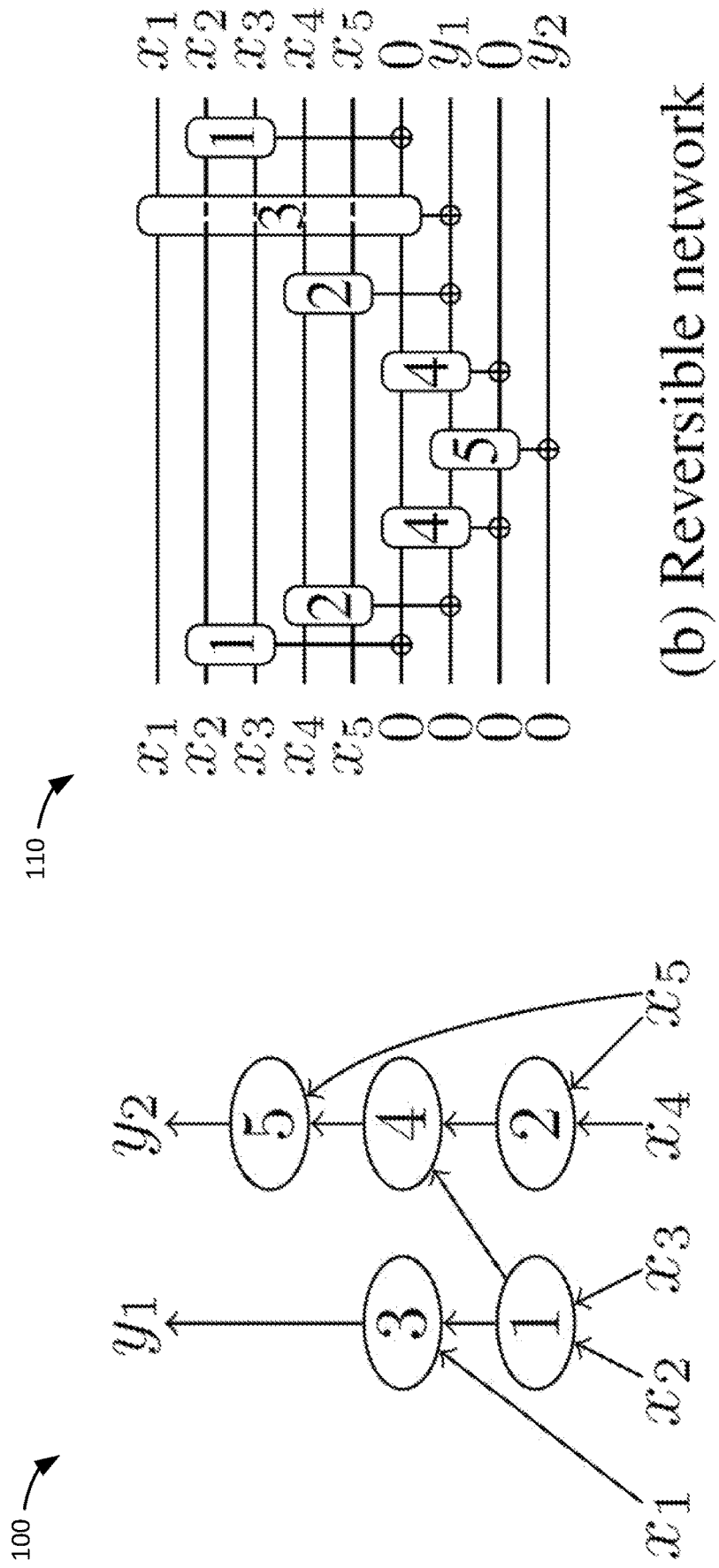
FIG. 1 are schematic block diagrams of examples for a LUT network and a translation into a reversible network.

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items. Further, as used herein, the term "and/or" means any one item or combination of any items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

II. Introduction

Quantum computing shows great promise for solving classically intractable computational problems. The wide range of potential applications includes factoring, material science, quantum chemistry, machine learning, and linear systems of equations.

Most of these quantum algorithms invoke subroutines which carry out a classical computation on a superposition of exponentially many input states. Examples include modular exponentiation for factoring, evaluating orbital functions for quantum chemistry (e.g., linear combinations of Gaussians), and reciprocals for solving systems of linear equations. While large-scale quantum computers able to run such algorithms are not yet available, it is nevertheless crucial to analyze the resulting circuits in order to acquire run time estimates. These can then guide further development of both quantum algorithms and hardware, allowing for efficient hardware-software co-design.

Compared to a fixed-point representation, floating-point arithmetic offers great savings in number of qubits when the range of values and/or relative precision is large. Yet, reversible implementations of floating-point adders and multipliers in the literature suggest enormous qubit and/or gate counts.

Embodiments of the disclosed technology remedy this problem by employing state-of-the-art synthesis tools to transform classical, non IEEE-compliant Verilog implementations to optimized reversible circuits. The results are presented in Sec. V. Additionally, several optimized circuits are disclosed in Sec. VI and compared to the two approaches to previous designs in Sec. VII.

III. Floating-Point Addition and Multiplication

In a floating-point representation, every number x is approximated using three registers: 1 sign bit $x_S$, M bits for the (non-negative) mantissa $x_M$ (a number in [1, 2)), and E bits for the exponent $x_E$. Then, $$x \approx (-1)^{x_S} x_M 2^{x_E}.$$

As a side note, since $x_M \in [1, 2)$, its highest bit is stored only implicitly as it is always 1.

This format allows one to represent a much larger range of values with a given number of bits than a fixed-point representation. Yet, basic arithmetic operations typically require more gates due to the extra steps involved to align and re-normalize intermediate results.

In particular, adding two floating-point numbers: $x=(x_S, x_M, x_E)$ and $y=(y_S, y_M, y_E)$ involves the following steps:
1. If $x_E < y_E$, swap the two floating-point numbers.
2. Compute two's complement from sign-bits and mantissas (including the implicit leading 1).
3. Align the two results according to the difference in exponents $\Delta_E = x_E - y_E$ (only if $|\Delta_E| < M$, else the addition will have no effect).
4. Add mantissas in two's complement.
5. Translate from two's complement to sign-bit and mantissa.
6. If adding the two mantissas caused an overflow, right-shift the result by 1 and increment the exponent.
7. Determine the position of the first 1. Left-shift the mantissa by that amount and then update the exponent accordingly.
8. When copying out the result, check if there was over/underflow in the exponent and output infinity or 0, respectively.

Multiplying floating-point numbers x and y, on the other hand, uses the following steps:
1. Determine result exponent $r_E = x_E + y_E$.
2. Multiply mantissas (including the implicit leading 1) into a 2M-bit register.
3. If there was overflow, right-shift by 1 and increment the result exponent.
4. If $x_E < 0$ and $y_E < 0$ but $r_E > 0$, output 0.
5. If $x_E \geq 0$ and $y_E \geq 0$ but $r_E < 0$, output infinity.
6. Determine the sign-bit of the result.

IV. Quantum Circuits

Figure 3:
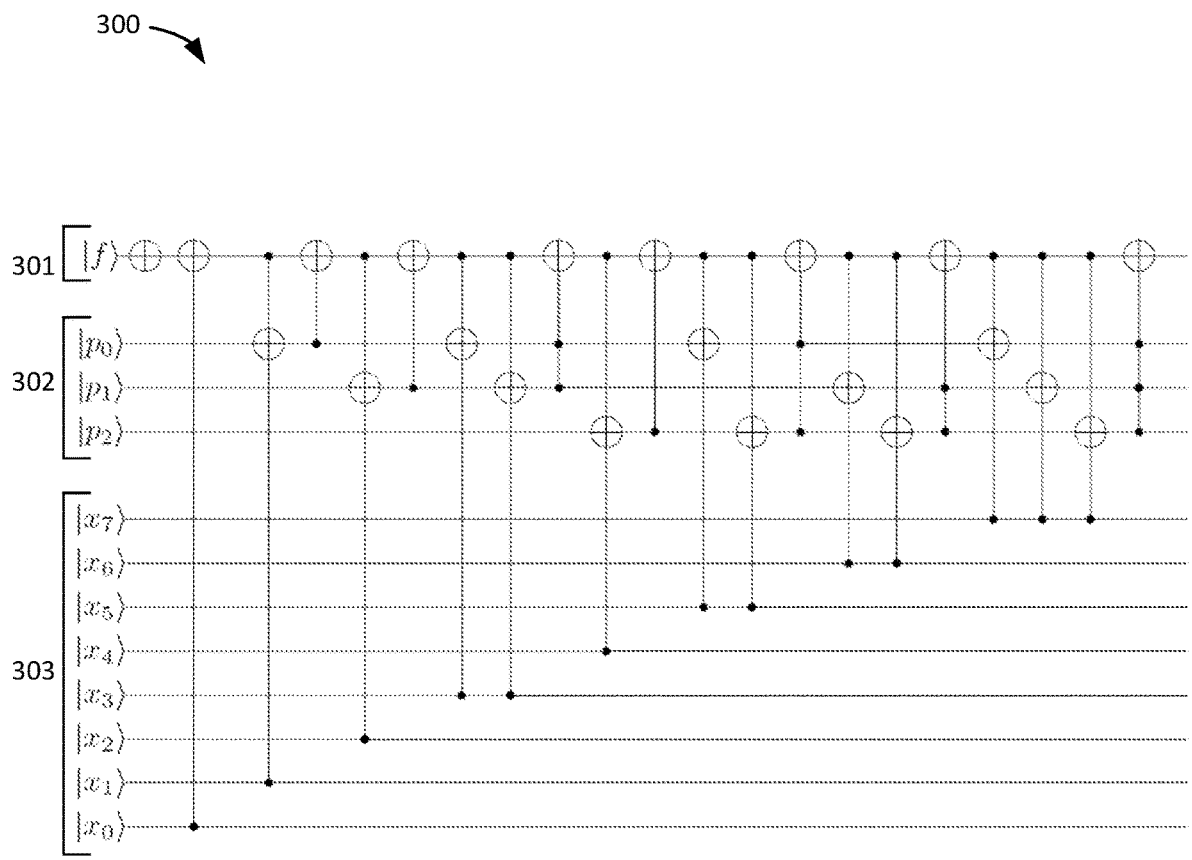
FIG. 3 illustrates a circuit for finding the first one in the bit-representation of a bit-vector.

Programs which run on a quantum computer can be described using quantum circuit diagrams, similar to the one depicted in FIG. 3. Each line represents a qubit and the program is executed from left to right. Because the time evolution of a closed quantum system is described by a unitary operator, every quantum instruction must be reversible (note that this does not include measurement). In particular, executing classical functions on a quantum computer involves mapping all classical non-reversible gates to Toffoli gates (doubly-controlled NOTs) acting on quantum bits (qubits). Furthermore, intermediate results need to be stored in temporary work qubits (ancilla qubits) in order to render the computation reversible.

For a large-scale quantum computation to succeed, quantum error correction is essential in order to reduce the effect of noise in the quantum system. In order to achieve this, quantum operations are desirably mapped to a discrete gate set. One such set of operations is called Clifford+T, where the T-gate is usually the most expensive quantum operation. There are several proposals to implement a T-gate, and all of them feature a large overhead in terms of physical qubits. By, e.g., having many T-gate factories available, the runtime of a quantum program can be estimated from the T-depth. To estimate the overhead in T-gate factories, also the number of T-gates which must be executed in parallel is an important measure. In combination with the number of logical qubits, these measures typically allow for a good estimate of the overall cost. These measures are therefore disclosed for the disclosed circuits.

In addition, the quantum cost (QC) can be used to compare different implementations. It is defined as $$QC = T\text{-depth} \cdot \#\text{Qubits}.$$

V. Automatic Circuit Synthesis

In this section, cost estimates are presented for both floating-point addition and multiplication based on reversible networks that are obtained from the LUT-based hierarchical synthesis approach (LHRS). LHRS reads as input a classical gate-level logic network, e.g., provided as Verilog file. It then uses conventional LUT mapping techniques to map the gate-level netlist into a LUT network composed of k-input LUT gates, which can realize any k-input Boolean function. An example for a LUT network where k=2 is illustrated in FIG. 1(a). Such a network is translated into a reversible network composed of single-target gates. FIG. 1(b) depicts one possible result of such a translation. Intermediate values are stored on ancillae, which are initialized 0 and need to be restored to their initial value after computation. The order in which the LUTs are traversed in this translation affects the number of ancillae, because an early uncomputation of ancilla

TABLE I

RESOURCE COUNTS FOR THE AUTOMATICALLY GENERATED CIRCUITS.

| Design | Width | Qubits | T-count | Runtime |
|---|---|---|---|---|
| Adder | 16 | 76 | 112,059,924 | 143.49 |
| Adder | 16 | 100 | 40,915 | 2.28 |
| Adder | 32 | 239 | 79,415 | 24.22 |
| Adder | 64 | 538 | 165,509 | 2.05 |
| Mult | 16 | 81 | 3,195,745 | 3276.00 |
| Mult | 32 | 351 | 1,110,133 | 238.82 |
| Mult | 64 | 1675 | 7,709,931 | 3318.67 | allows one to reuse them for other intermediate values. The aim is to find a reversible network with as few ancillae as possible. In the reversible network each single-target gates is mapped to a Clifford+T network. For this purpose, different algorithms have been proposed.

To obtain circuits using LHRS, one can optimize proprietary IP blocks for floating-point addition and multiplication for gate count and map them into AND-inverter graphs (AIGs), which are logic networks that are composed of AND gates and inverters. Further, the IP blocks can be configured in a way that their functionality is as close to the functionality of the hand-optimized circuits. That is, the IP blocks are not IEEE compliant and rounding is always closest to zero. In one example, the obtained AIG representation is used as a starting point for the initial k-LUT mapping. As value for k, the smallest value is used such that the number of used qubits does not exceed the number of qubits obtained from the hand-optimized circuits. To find that value, one can run LHRS without mapping the single-target gates into Clifford+T networks. This step is typically quite fast, and the runtime for it can be neglected.

For each single-target gate, one can use available mappers and compare the quality of the resulting Clifford+T networks, then take the best one.

VI. Hand-Optimized Circuits

In this section, hand-optimized circuits are presented for both floating-point addition and multiplication. The individual circuit components are detailed and resource estimates are provided in order to compare to the synthesis approach discussed in Sec. V.

TABLE II

RESOURCE COUNTS FOR THE HAND-OPTIMIZED CIRCUITS. EACH TOFFOLI GATE WAS DECOMPOSED USING 7 T-GATES IN T-DEPTH 3, PROVIDING AN UPPER-BOUND ON THE ACTUAL T-COUNT.

| Design | Width | Qubits | T-count | T-depth |
|---|---|---|---|---|
| Adder | 16 | 76 | 4,704 | 1,386 |
| Adder | 32 | 140 | 11,144 | 3,138 |
| Adder | 64 | 268 | 26,348 | 7,224 |
| Mult | 16 | 81 | 6,328 | 2,580 |
| Mult | 32 | 158 | 26,642 | 11,154 |
| Mult | 64 | 315 | 122,752 | 52,116 |

A. Basic Building Blocks

The disclosed floating-point circuits comprise a series of basic building blocks. The integer adder from Yasuhiro Takahashi et al., "Quantum addition circuits and unbounded fan-out," arXiv preprint arXiv:0910.2530 (2009) is used and an integer multiplier is constructed from it using the standard shift-and-add approach. To compare two n-bit numbers, one can perform a subtraction using one extra qubit (e.g., on n+1 bits), followed by an addition without this extra qubit, which holds the result of the comparison. If the comparison involves a classically-known constant, one can use the CARRY circuit from Thomas Haner et al., "Factoring using 2n+2 qubits with Toffoli-based modular multiplication," Quantum Information and Computation, 17(7 and 8) (2017).

The only floating-point-specific blocks are the ones used to determine the location of the first one in a bit-string, and to shift the mantissa by an amount s (specified in an input register). More specifically, the first circuit achieves the mapping $$|x\rangle|0\rangle \overset{F}{\mapsto} |x\rangle|\lfloor \log_2(x) \rfloor\rangle,$$

where x is interpreted as a positive integer. The shift circuits $S^{\pm}$ perform the mapping $$|s\rangle|x\rangle \overset{S^{\pm}}{\mapsto} |s\rangle|2^{\pm s}x\rangle.$$

In this case, x is a 2M-bit register, where the first/last NM bits are guaranteed to be zero, and s is a $\log_2$ M-bit register representing the shift.

B. Implementation

Figure 2:
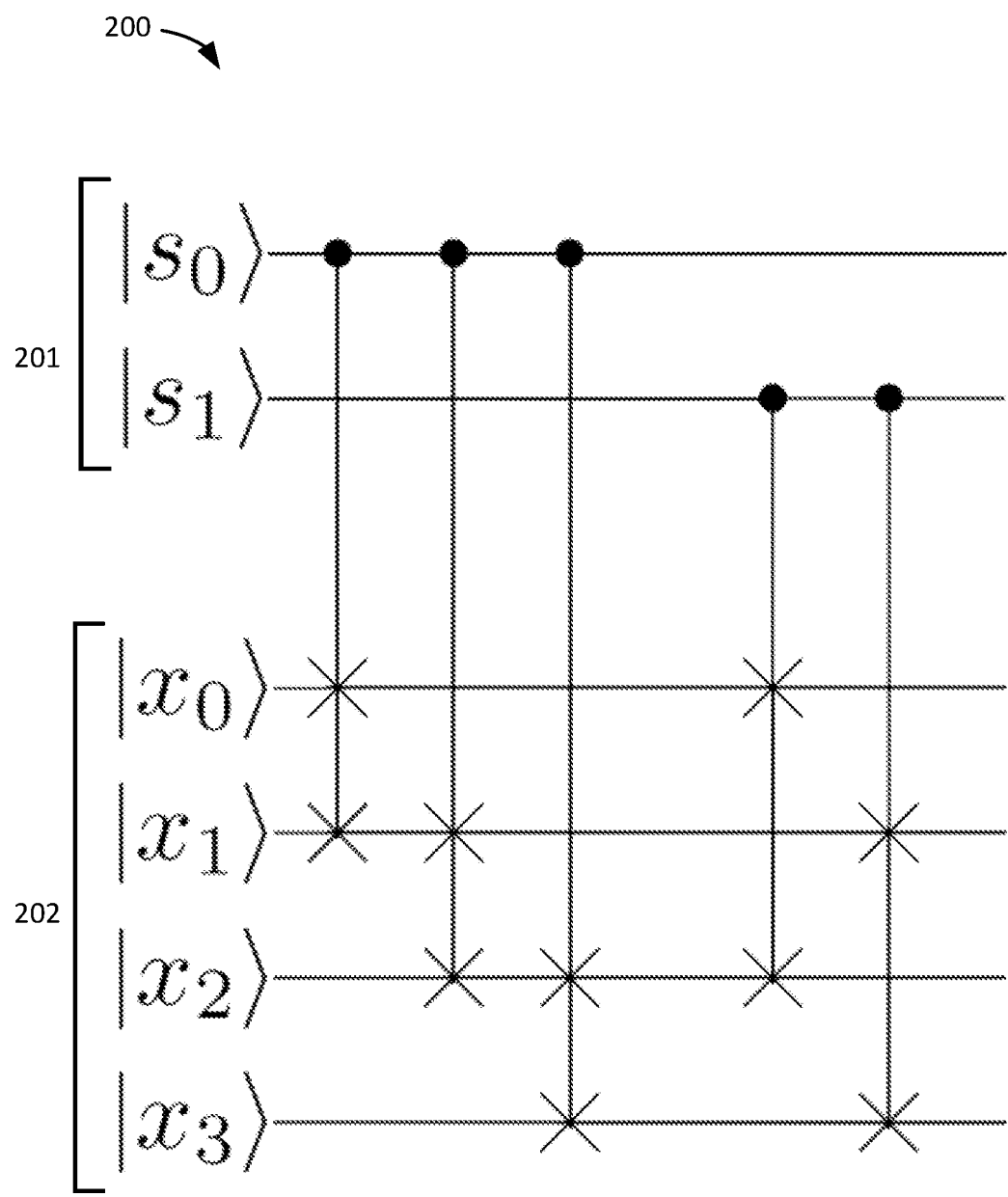
FIG. 2 illustrates an implementation of a shift circuit for a 4-bit number and a 2-bit encoding of the shift.

FIG. 2 illustrates an implementation of a shift circuit for a 4-bit number x. The shift s must be such that the first (least-significant) s bits of x are 0. Variations of this circuit are desirable to enable shifts in both directions and to ensure that the sign-bit is copied when right-shifting a negative number in two's complement.

FIG. 3 illustrates a circuit for finding the first one in the bit-representation of x. The flag f (which is initially set to 1 using the first NOT gate) is toggled to 0 as soon as the first 1 has been found. The position of the first one is stored in the p-register, comprising 3 bits in this example.

A straight-forward implementation of these shift circuits $S^\pm$ would, for every $m \in \{0, \ldots, M-1\}$, copy out the M-bit value x shifted by m bits into a new 2M-bit register, conditional on s being equal to m.

To save M qubits, x can first be padded with M bits to the left/right. This allows exchanging the copy-operations above with swaps: For each $m \in \{1, \ldots, M-1\}$, the bits of x can be swapped m bits to the left/right, starting at the left-/right-most bit. Yet, this approach uses M(M−1) Fredkin gates.

An $\mathcal{O}(n \log n)$ implementation can be obtained by swapping the bits of x to the left/right by $2^k$, conditional on the k-th bit of the shift-register $|s\rangle$ and repeating this for every $k \in \{0, \ldots, \log_2 M-1\}$. An example circuit for a 2-bit shift register and a 4-bit x-register was generated using ProjectQ [?] and is shown in FIG. 3. In general, this circuit requires $(\log_2 M-1)M+1$ Fredkin gates for a $\log_2$ M-sized shift-register.

Finding the first one, e.g., implementing the F operation mentioned above, can be achieved using a circuit similar to the one in FIG. 1(b), which depicts an example for 8 bits. The flag f being 1 indicates that the first 1 in the bit-representation of x has not yet been found. For every bit $x_i$ of x (starting with bit-index i=0), the position register is initialized to i if the flag is 1 and $x_i=1$ (e.g., it is the first 1). Then, the flag-bit is flipped conditional on the position register being equal to the current i (note that only positive controls need to be placed on the position register).

All of the components were implemented and thoroughly tested using a reversible simulator extension to LIQUi|⟩. The resulting resource counts can be found in Table II.

VII. Comparison and Practicality

The disclosed design only uses ⅙ of the number of qubits and features a quantum cost (QC) of $QC = T\text{-Depth} \cdot \#\text{Qubits}$ $\leq 439{,}320,$ It is also useful to note that floating-point multiplication is not much more expensive than it is in a fixed-point representation. Therefore, together with the fact that many applications feature similar numbers of additions and multiplications (often they can even be combined into a single fused multiply-add instruction), this means that the overhead of floating-point arithmetic in the quantum setting is less than what is generally expected, especially since multiplication is much more expensive than addition (for both fixed- and floating-point numbers). Thus, a possibly more accurate estimate of the floating-point arithmetic overhead is the ratio between quantum costs for fixed- and floating-point multiplication. The QC ratio between a 32-bit floating-point multiplier and a 24-bit fixed-point multiplier (where one desirably uses intermediate results to be computed for the full 2M bits) is $$\frac{QC^{mul}_{float}}{QC^{mul}_{fixed}} = \frac{11{,}154 \cdot 158}{10{,}656 \cdot 5 \cdot 24}$$

VIII. Summary and Outlook

Given the strict requirements of the IEEE standard, it is expected that IEEE-compliant floating-point arithmetic features large overheads compared to fixed-point arithmetic. Furthermore, even when considering non IEEE-compliant blocks, the number of gates obtained from circuit synthesis is much larger than what would be expected from a fixed-point implementation. Yet, in combination with manual circuit optimization, relaxing the requirements allows for significant savings in both width and size of the circuit, rendering the use of floating-point arithmetic for future quantum devices much more practical.

One reason for the large discrepancy between the two approaches is that the objective function used in the optimization process for classical computing is very different from the one used in quantum computing: In classical computing, the most costly resource is time and bits are essentially free. Circuits resulting from an optimization procedure aiming to minimize the cost function for classical computing are thus highly parallel, but they also use more bits. In quantum computing, on the other hand, both circuit depth and width (e.g., number of bits) are precious resources. This makes introducing parallelism harder and an optimization procedure would generate vastly different circuits featuring less parallelism and fewer bits.

While the hand-optimized circuits feature fewer qubits and T-gates, it is very likely that some of the subroutines may still be further optimized using methods from the automatic synthesis approach. Furthermore, the interplay among different components in the hand-written circuit may benefit from such a procedure.

IX. Example Computing Environments

Figure 4:
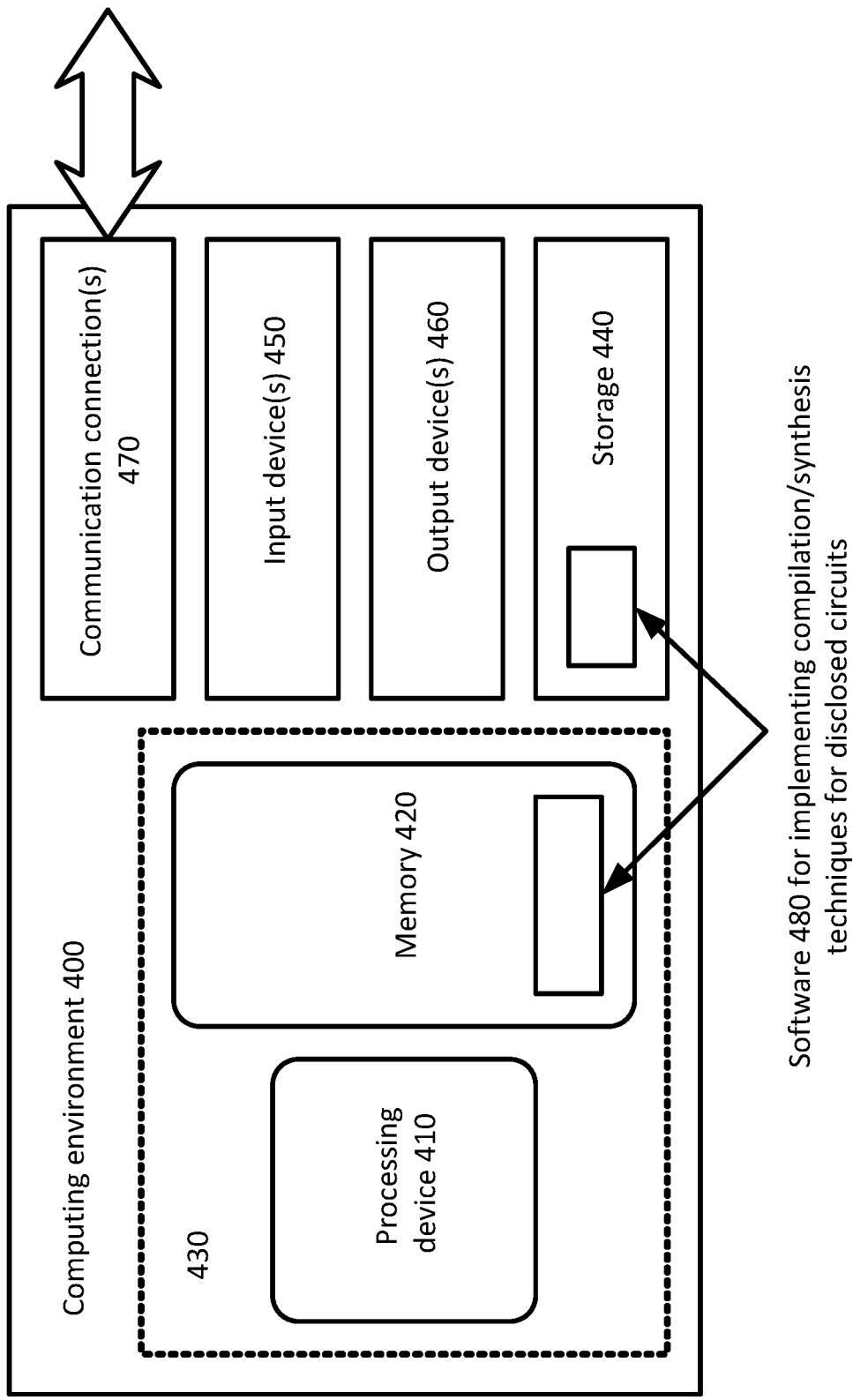
FIG. 4 illustrates a generalized example of a suitable computing environment in which several of the described embodiments can be implemented.

FIG. 4 illustrates a generalized example of a suitable computing environment 400 in which several of the described embodiments can be implemented. The computing environment 400 is not intended to suggest any limitation as to the scope of use or functionality of the disclosed technology, as the techniques and tools described herein can be implemented in diverse general-purpose or special-purpose environments that have computing hardware.

With reference to FIG. 4, the computing environment 400 includes at least one processing device 410 and memory 420. In FIG. 4, this most basic configuration 430 is included within a dashed line. The processing device 410 (e.g., a CPU or microprocessor) executes computer-executable instructions. In a multi-processing system, multiple processing devices execute computer-executable instructions to increase processing power. The memory 420 may be volatile memory (e.g., registers, cache, RAM, DRAM, SRAM), non-volatile memory (e.g., ROM, EEPROM, flash memory), or some combination of the two. The memory 420 stores software 480 implementing tools for synthesizing, generating, or compiling one or more of the circuits as described herein.

The computing environment can have additional features. For example, the computing environment 400 includes storage 440, one or more input devices 450, one or more output devices 460, and one or more communication connections 470. An interconnection mechanism (not shown), such as a bus, controller, or network, interconnects the components of the computing environment 400. Typically, operating system software (not shown) provides an operating environment for other software executing in the computing environment 400, and coordinates activities of the components of the computing environment 400.

The storage 440 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 400. The storage 440 can also store instructions for the software 480 implementing, generating, or synthesizing any of the described techniques, systems, or reversible circuits.

The input device(s) 450 can be a touch input device such as a keyboard, touchscreen, mouse, pen, trackball, a voice input device, a scanning device, or another device that provides input to the computing environment 400. The output device(s) 460 can be a display device (e.g., a computer monitor, laptop display, smartphone display, tablet display, netbook display, or touchscreen), printer, speaker, or another device that provides output from the computing environment 400.

The communication connection(s) 470 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods, circuit design, or compilation/synthesis techniques for generating the disclosed circuits can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 420 and/or storage 440, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 5:
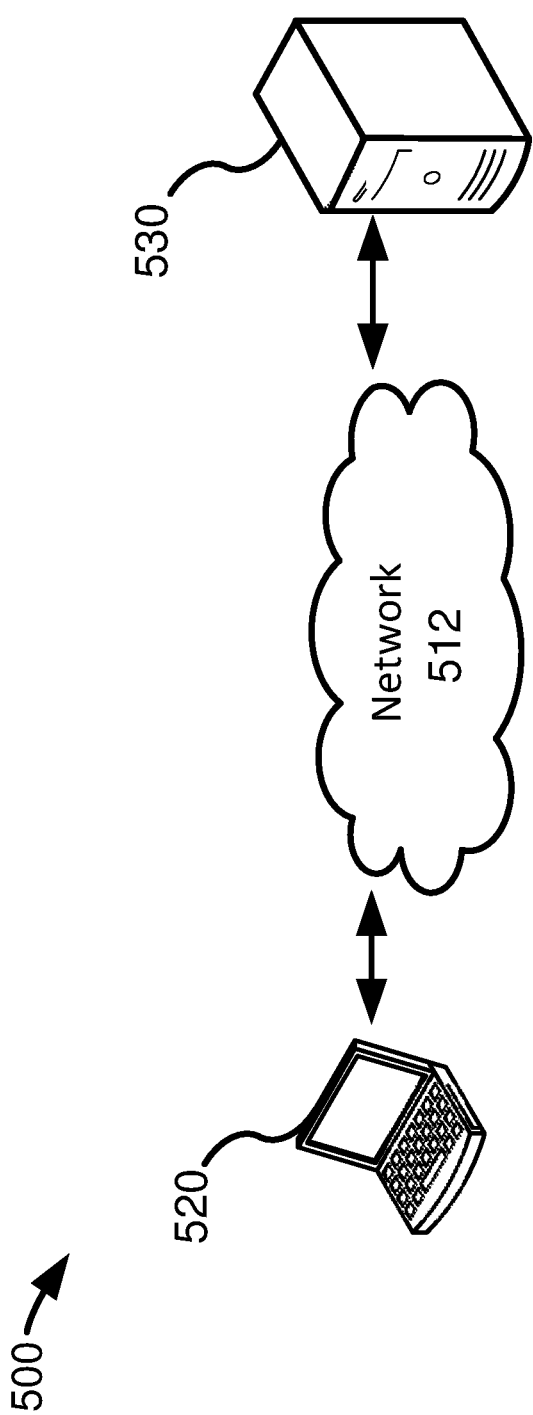
FIG. 5 illustrates an example of a possible network topology (e.g., a client-server network).

An example of a possible network topology 500 (e.g., a client-server network) for implementing a system according to the disclosed technology is depicted in FIG. 5. Networked computing device 520 can be, for example, a computer running a browser or other software connected to a network 512. The computing device 520 can have a computer architecture as shown in FIG. 4 and discussed above. The computing device 520 is not limited to a traditional personal computer but can comprise other computing hardware configured to connect to and communicate with a network 512 (e.g., smart phones, laptop computers, tablet computers, or other mobile computing devices, servers, network devices, dedicated devices, and the like). In the illustrated embodiment, the computing device 520 is configured to communicate with a computing device 530 (e.g., a remote server, such as a server in a cloud computing environment) via a network 512. In the illustrated embodiment, the computing device 520 is configured to transmit input data to the computing device 530, and the computing device 530 is configured to implement circuit generation or compilation/synthesis methods for generating any of the disclosed circuits and outputting results to the computing device 520. Any of the data received from the computing device 530 can be stored or displayed on the computing device 520 (e.g., displayed as data on a graphical user interface or web page at the computing devices 520). In the illustrated embodiment, the illustrated network 512 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 512 can be the Internet or a similar public network and operate using an appropriate protocol (e.g., the HTTP protocol).

Figure 6:
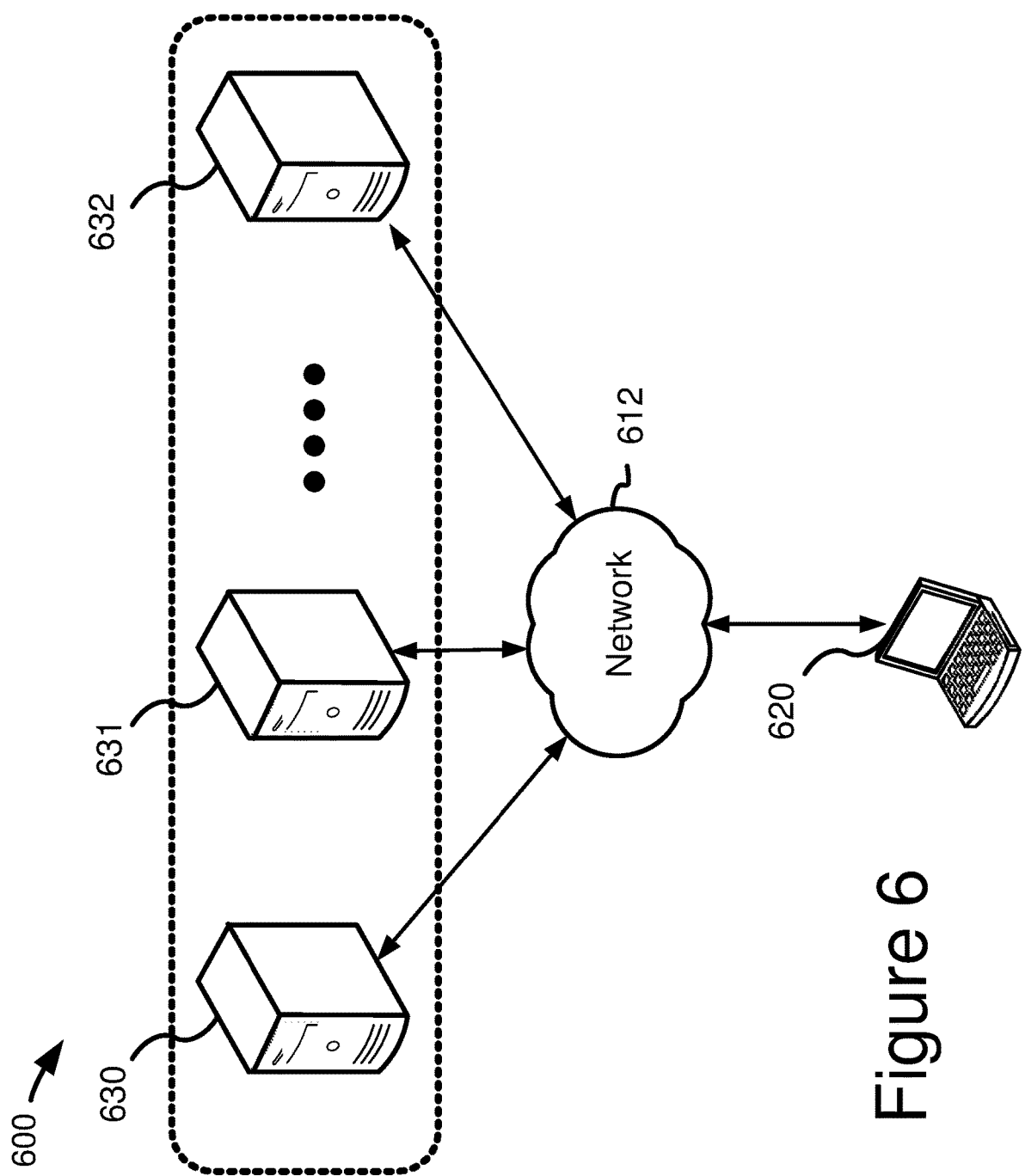
FIG. 6 illustrates another example of a possible network topology (e.g., a distributed computing environment).

Another example of a possible network topology 600 (e.g., a distributed computing environment) for implementing a system according to the disclosed technology is depicted in FIG. 6. Networked computing device 620 can be, for example, a computer running a browser or other software connected to a network 612. The computing device 620 can have a computer architecture as shown in FIG. 4 and discussed above. In the illustrated embodiment, the computing device 620 is configured to communicate with multiple computing devices 630, 631, 632 (e.g., remote servers or other distributed computing devices, such as one or more servers in a cloud computing environment) via the network 612. In the illustrated embodiment, each of the computing devices 630, 631, 632 in the computing environment 1400 is used to perform at least a portion of a circuit generation or synthesis/compilation process. In other words, the computing devices 630, 631, 632 form a distributed computing environment in which the generation/compilation/synthesis processes are shared across multiple computing devices. The computing device 620 is configured to transmit input data to the computing devices 630, 631, 632, which are configured to distributively implement such as process, including performance of any of the disclosed methods or creation of any of the disclosed circuits, and to provide results to the computing device 620. Any of the data received from the computing devices 630, 631, 632 can be stored or displayed on the computing device 620 (e.g., displayed as data on a graphical user interface or web page at the computing devices 620). The illustrated network 612 can be any of the networks discussed above with respect to FIG. 5.

Figure 7:
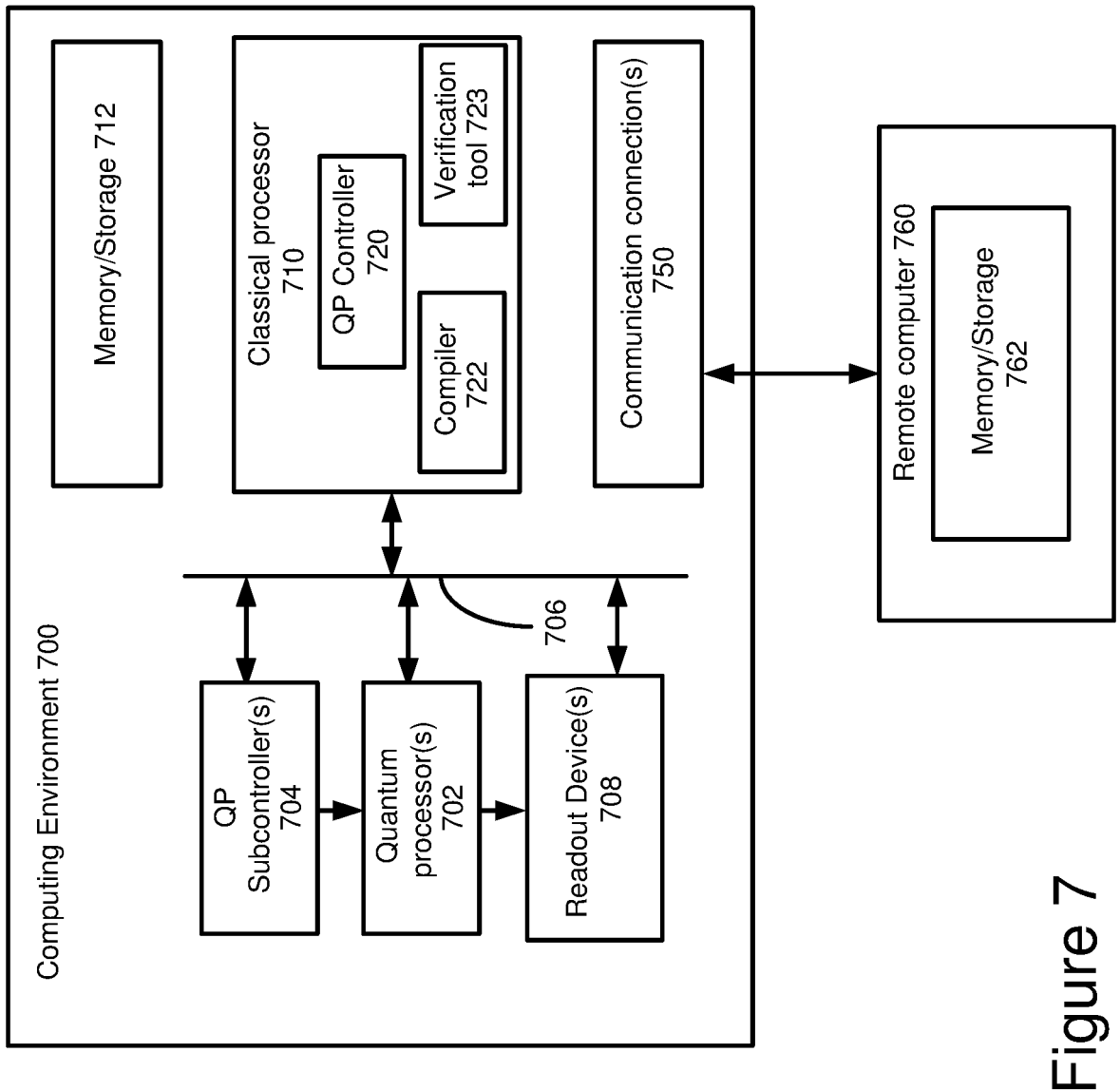
FIG. 7 illustrates an exemplary system for implementing the disclosed technology.

With reference to FIG. 7, an exemplary system for implementing the disclosed technology includes computing environment 700. In computing environment 700, a compiled quantum computer circuit description including any of the disclosed quantum circuits in accordance with any of the disclosed embodiments can be used to program (or configure) one or more quantum processing units such that the quantum processing unit(s) implement the circuit described by the quantum computer circuit description. The quantum computer circuit description can implement any of the disclosed circuits.

The environment 700 includes one or more quantum processing units 702 and one or more readout device(s) 708. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits, can be sent into (or otherwise applied to) the quantum processing unit(s) via control lines 706 at the control of quantum processor controller 720. The quantum processor controller (QP controller) 720 can operate in conjunction with a classical processor 710 (e.g., having an architecture as described above with respect to FIG. 4) to implement the desired quantum computing process. In the illustrated example, the QP controller 720 further implements the desired quantum computing process via one or more QP subcontrollers 704 that are specially adapted to control a corresponding one of the quantum processor(s) 702. For instance, in one example, the quantum controller 720 facilitates implementation of the compiled quantum circuit by sending instructions to one or more memories (e.g., lower-temperature memories), which then pass the instructions to low-temperature control unit(s) (e.g., QP subcontroller(s) 704) that transmit, for instance, pulse sequences representing the gates to the quantum processing unit(s) 702 for implementation. In other examples, the QP controller(s) 720 and QP subcontroller(s) 704 operate to provide appropriate magnetic fields, encoded operations, or other such control signals to the quantum processor(s) to implement the operations of the compiled quantum computer circuit description. The quantum controller(s) can further interact with readout devices 708 to help control and implement the desired quantum computing process (e.g., by reading or measuring out data results from the quantum processing units once available, etc.)

With reference to FIG. 7, compilation is the process of translating a high-level description of a quantum algorithm into a quantum computer circuit description comprising a sequence of quantum operations or gates, which can include the circuits as disclosed herein. The compilation can be performed by a compiler 722 using a classical processor 710 (e.g., as shown in FIG. 4) of the environment 700 which loads the high-level description from memory or storage devices 712 and stores the resulting quantum computer circuit description in the memory or storage devices 712.

In other embodiments, compilation and/or verification can be performed remotely by a remote computer 760 (e.g., a computer having a computing environment as described above with respect to FIG. 4) which stores the resulting quantum computer circuit description in one or more memory or storage devices 762 and transmits the quantum computer circuit description to the computing environment 700 for implementation in the quantum processing unit(s) 702. Still further, the remote computer 700 can store the high-level description in the memory or storage devices 762 and transmit the high-level description to the computing environment 700 for compilation and use with the quantum processor(s). In any of these scenarios, results from the computation performed by the quantum processor(s) can be communicated to the remote computer after and/or during the computation process. Still further, the remote computer can communicate with the QP controller(s) 720 such that the quantum computing process (including any compilation, verification, and QP control procedures) can be remotely controlled by the remote computer 760. In general, the remote computer 760 communicates with the QP controller(s) 720, compiler/synthesizer 722, and/or verification tool 723 via communication connections 750.

In particular embodiments, the environment 700 can be a cloud computing environment, which provides the quantum processing resources of the environment 700 to one or more remote computers (such as remote computer 760) over a suitable network (which can include the internet).

X. Example Generalized Environments

Further details for exemplary non-limiting embodiments of the disclosed tools and techniques are shown in FIGS. 1-3 and 8-19.

For example, FIG. 1 is schematic block diagrams of examples for a LUT network where k=2. FIG. 1(a) illustrates such a network that is translated into a reversible network composed of single-target gates. FIG. 1(b) depicts one possible result of such a translation.

FIG. 2 illustrates an implementation of a shift circuit for a 4-bit number x 202 and a 2-bit encoding of the shift 201.

FIG. 3 illustrates a circuit for finding the first one in the bit-representation of x. The flag f 301 is toggled to value 0 as soon as the first one in the input vector x 303 has been found. The position of the first one is stored in the register p 302. In this example the input x 303 consists of 8 bits and the location register p 302 consists of 3 bits.

Figure 8:
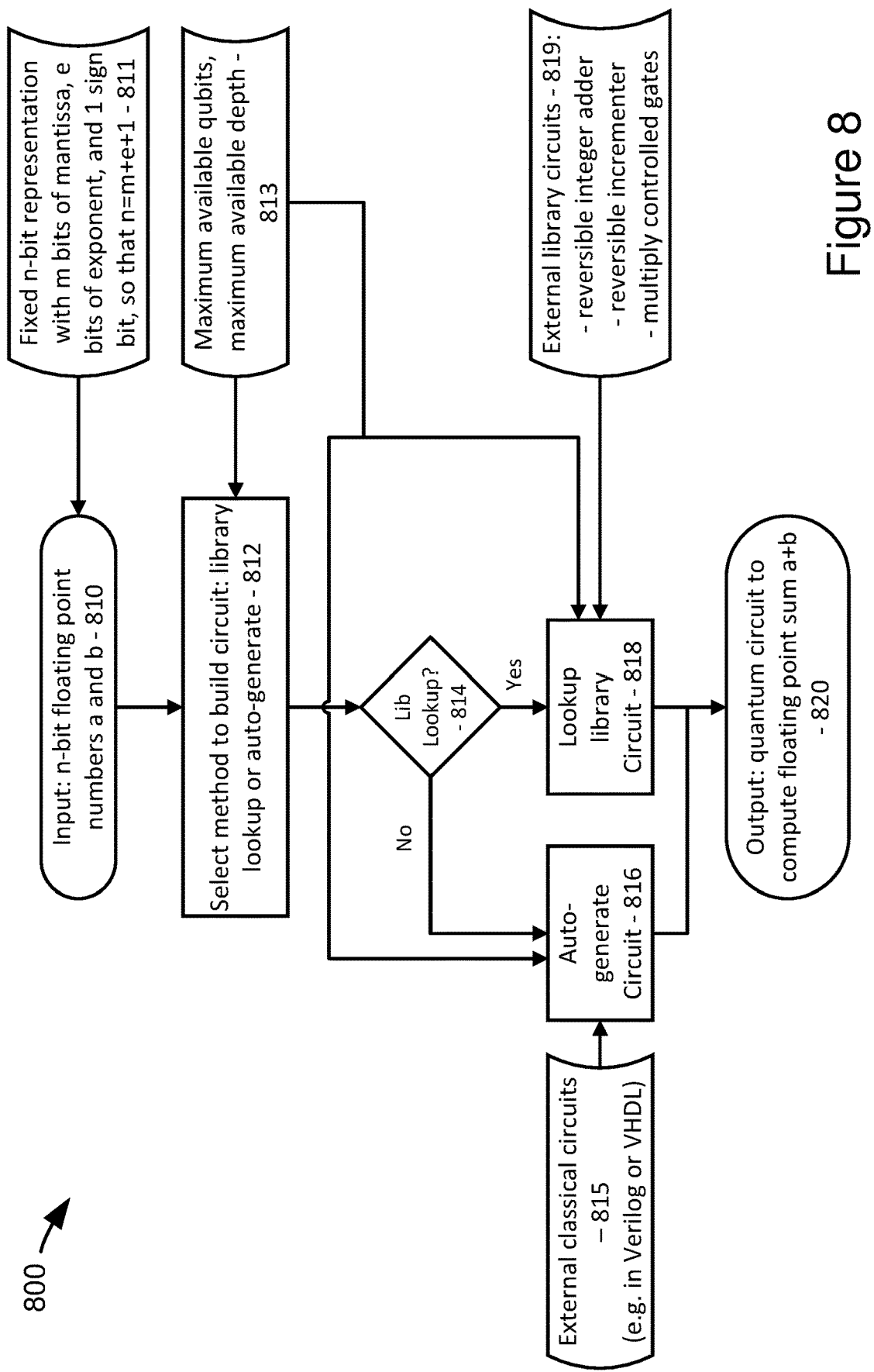
FIG. 8 is a schematic diagram that illustrates an example method for generating a quantum circuit to complete a floating point sum.

FIG. 8 is a flowchart 800 showing a generalized example embodiment for implementing an embodiment of the disclosed technology to complete a floating point sum a+b 820 from inputs n-bit floating point numbers a and b 810. The particular operations and sequence of operations should not be construed as limiting, as they can be performed alone or in any combination, subcombination, and/or sequence with one another. Additionally, the illustrated operations can be performed together with one or more other operations. Still further, the identified operations need not be performed by a single software module, but can be implemented using multiple modules or software tools, which collectively perform the illustrated method. The method uses technology parameters such as maximum available qubits and maximum available circuit depth 813 as well as externally available libraries for underlying arithmetic 819 to compose the targeted addition circuits, either based on automatically generated circuits 816 or by looking up circuits from a precomputed library of circuits 818.

Figure 9:
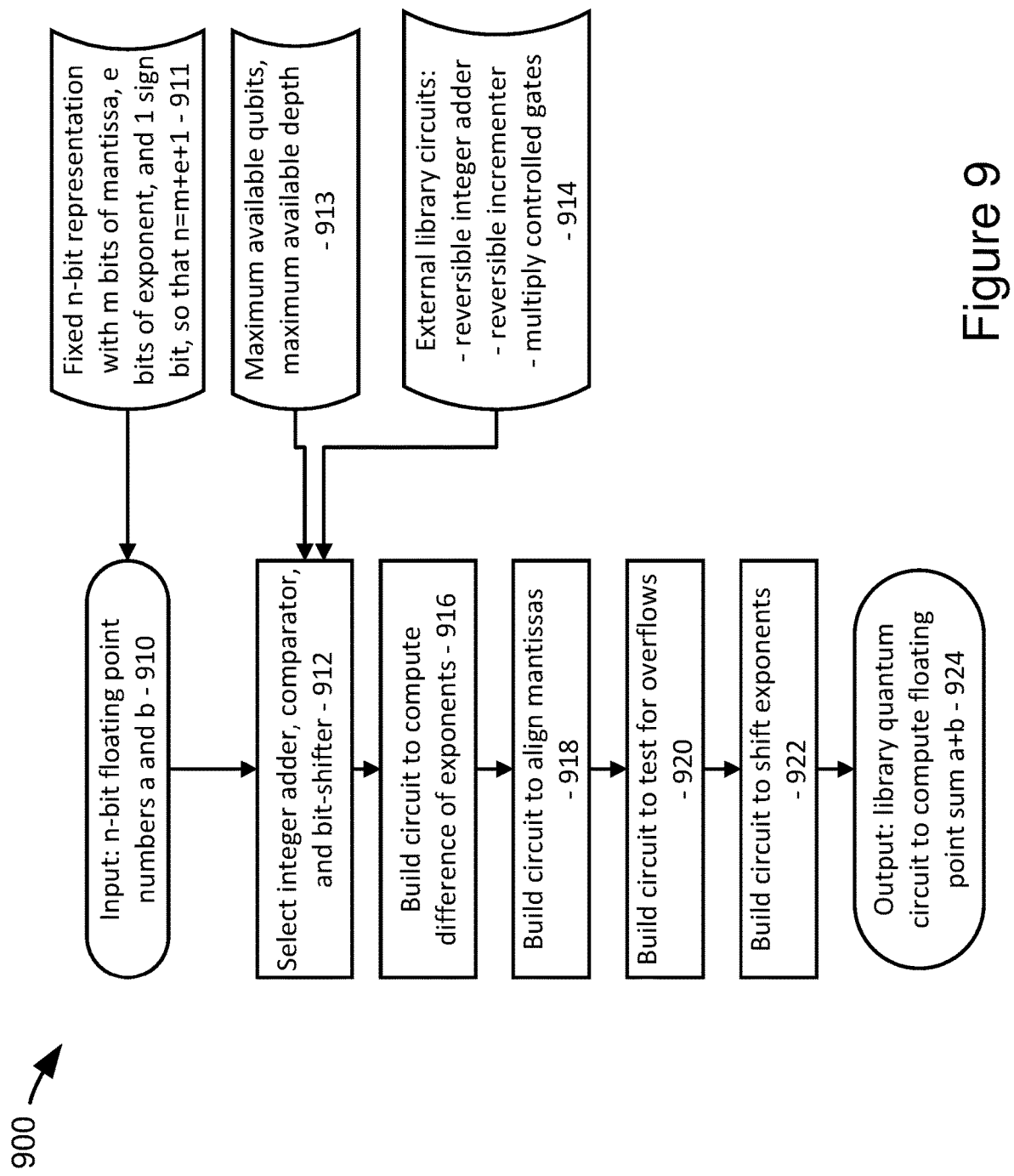
FIG. 9 is a schematic diagram that describes example steps in constructing a floating point adder via an automatically generated circuit.

FIG. 9 is a flowchart 900 illustrating an example method for performing a construction of a floating point adder via an automatically generated circuit. In particular, FIG. 9 is a flowchart 900 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. Still further, the identified operations need not be performed by a single software module, but can be implemented using multiple modules or software tools, which collectively perform the illustrated method.

Figure 10:
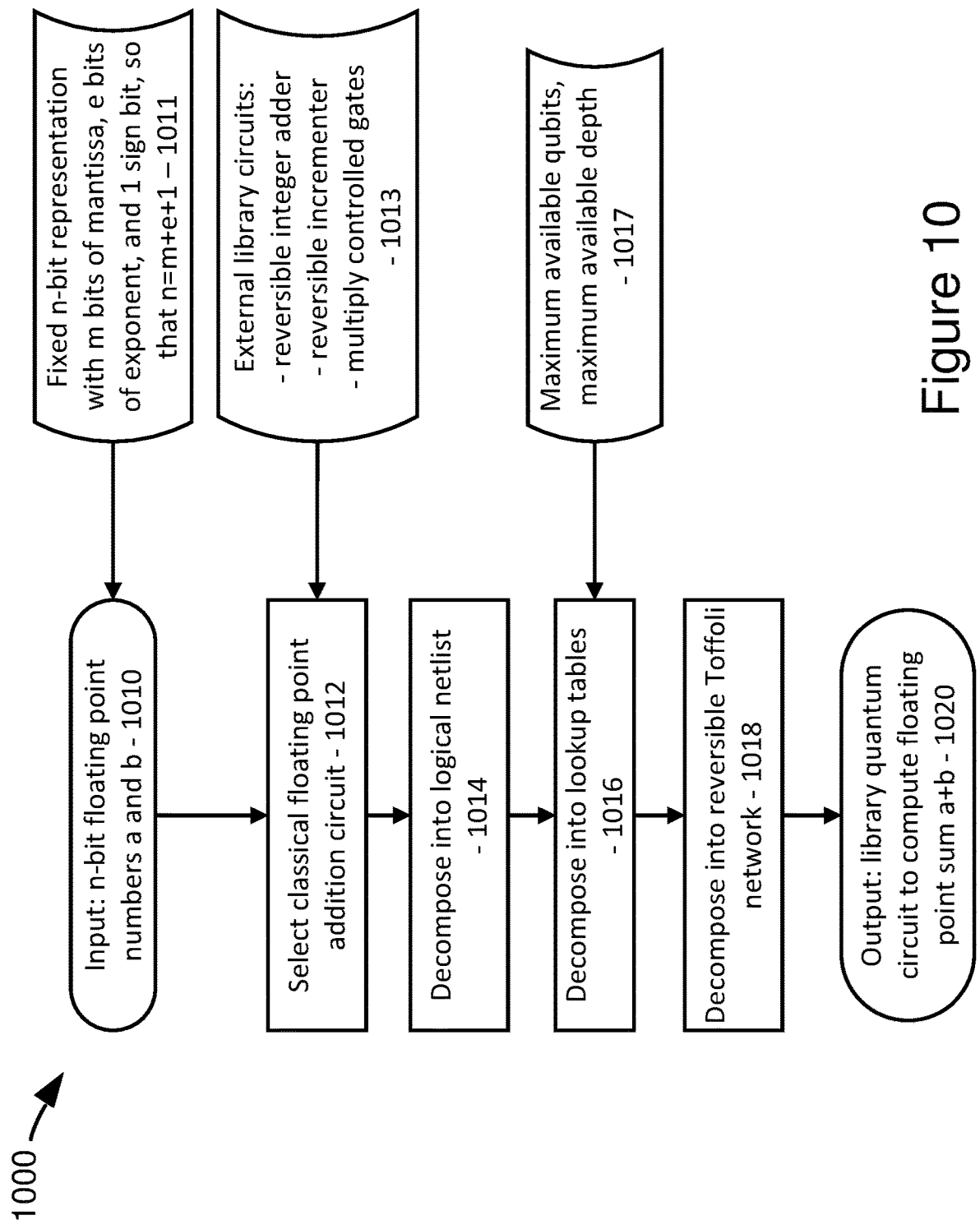
FIG. 10 is a schematic diagram that describes example steps in constructing a floating point adder via looking up a precomputed library of circuits.

FIG. 10 is a flowchart 1000 illustrating an example method for performing a construction of a floating point adder via a lookup of precomputed library circuits. In particular, FIG. 10 is a flowchart 1000 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. Still further, the identified operations need not be performed by a single software module, but can be implemented using multiple modules or software tools, which collectively perform the illustrated method.

Figure 11:
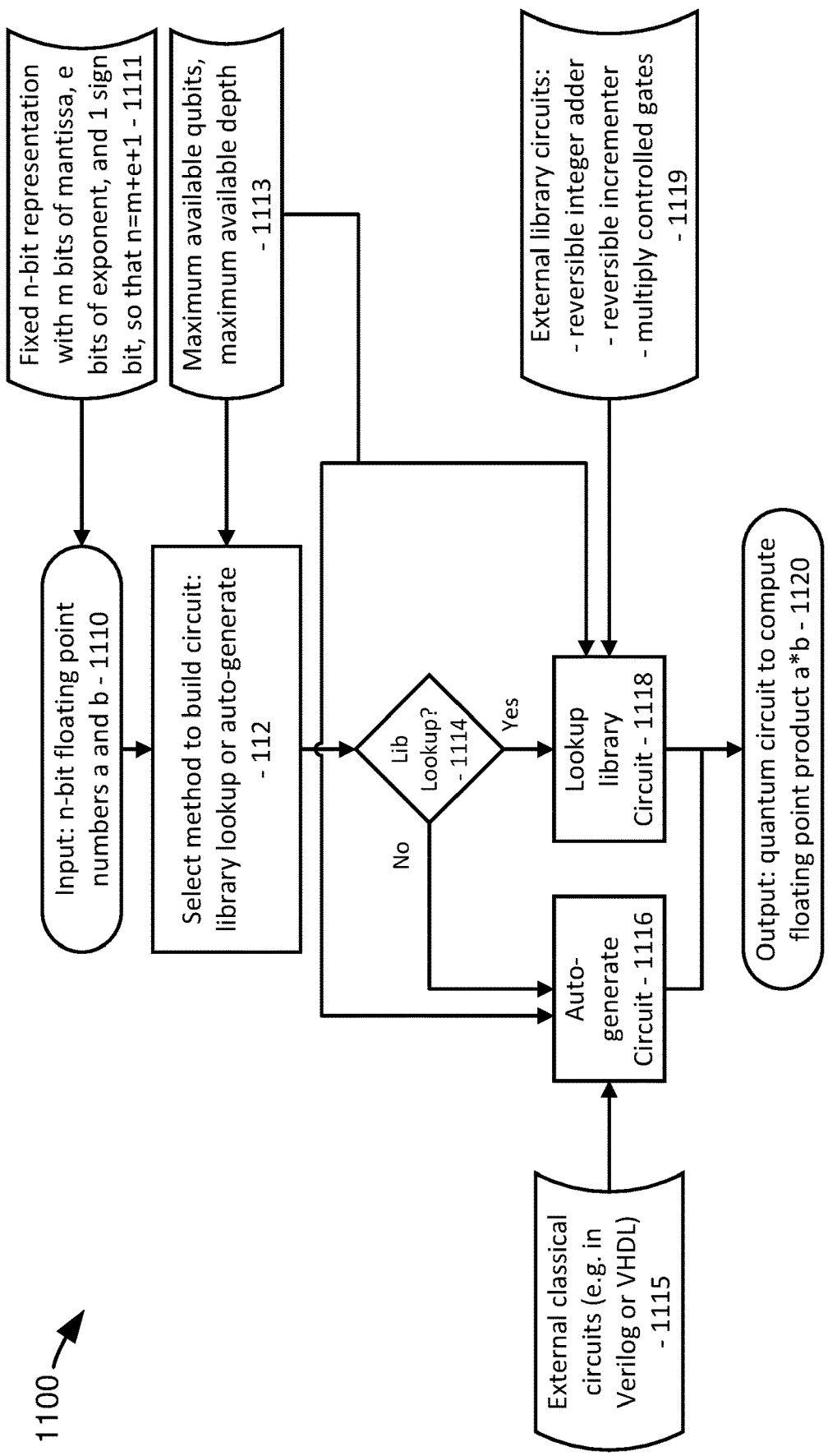
FIG. 11 is a schematic diagram that illustrates an example method for generating a quantum circuit to complete a floating point product.

FIG. 11 is a schematic diagram that illustrates a method for generating a quantum circuit to complete a floating point product a*b 1120 from inputs n-bit floating point numbers a and b 1110. The method uses technology parameters such as maximum available qubits and maximum available circuit depth 1113 as well as externally available libraries for underlying arithmetic 1119 to compose the targeted addition circuits, either based on automatically generated circuits 1116 or by looking up circuits from a precomputed library of circuits 1118.

Figure 12:
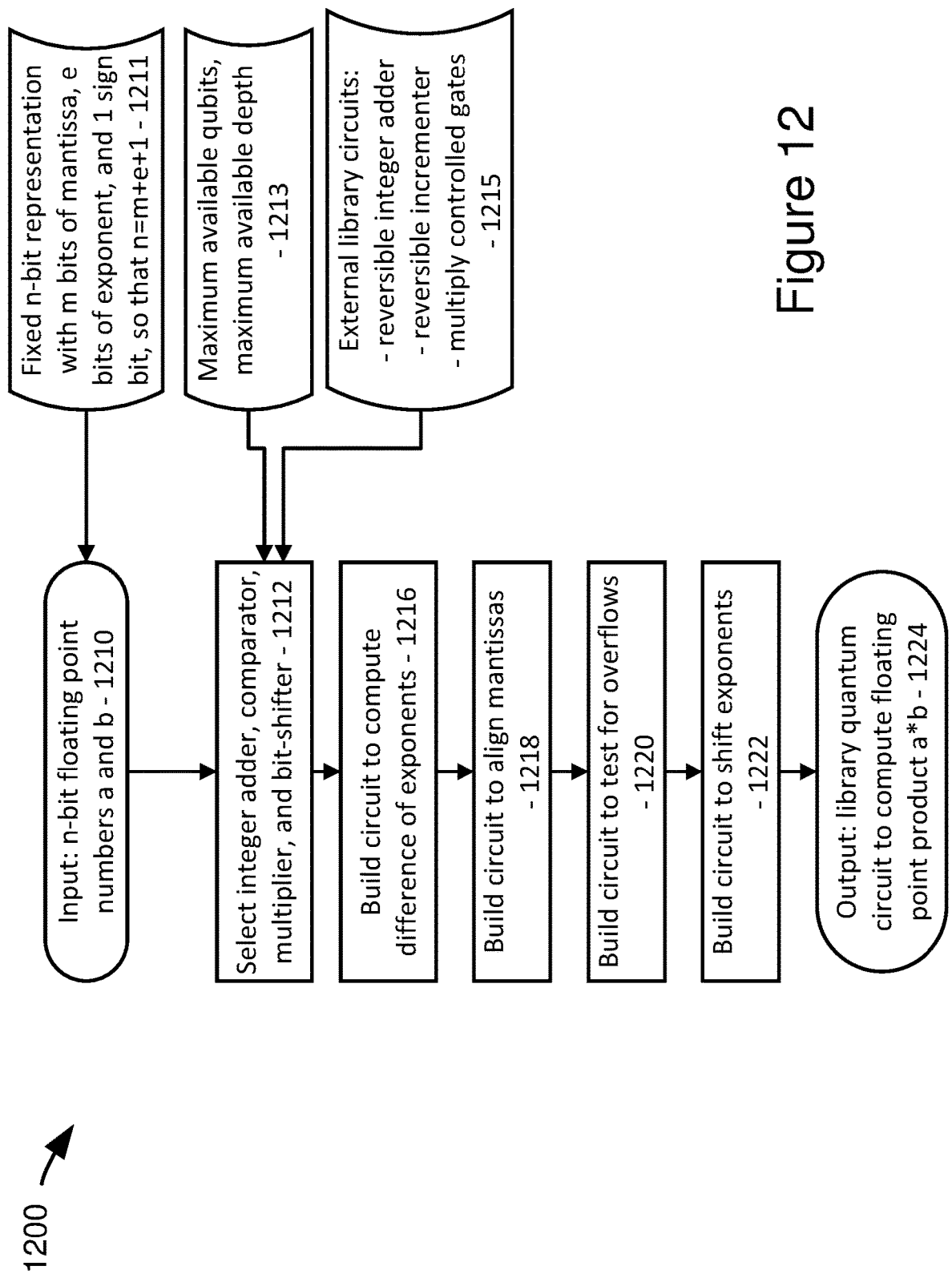
FIG. 12 is a schematic diagram that describes example steps in constructing a floating point multiplier via an automatically generated circuit.

FIG. 12 is a flowchart 1200 illustrating an example method for performing a library circuit lookup for a floating point multiplier via an automatically generated circuit. In particular. FIG. 12 is a flowchart 1200 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. Still further, the identified operations need not be performed by a single software module, but can be implemented using multiple modules or software tools, which collectively perform the illustrated method.

Figure 13:
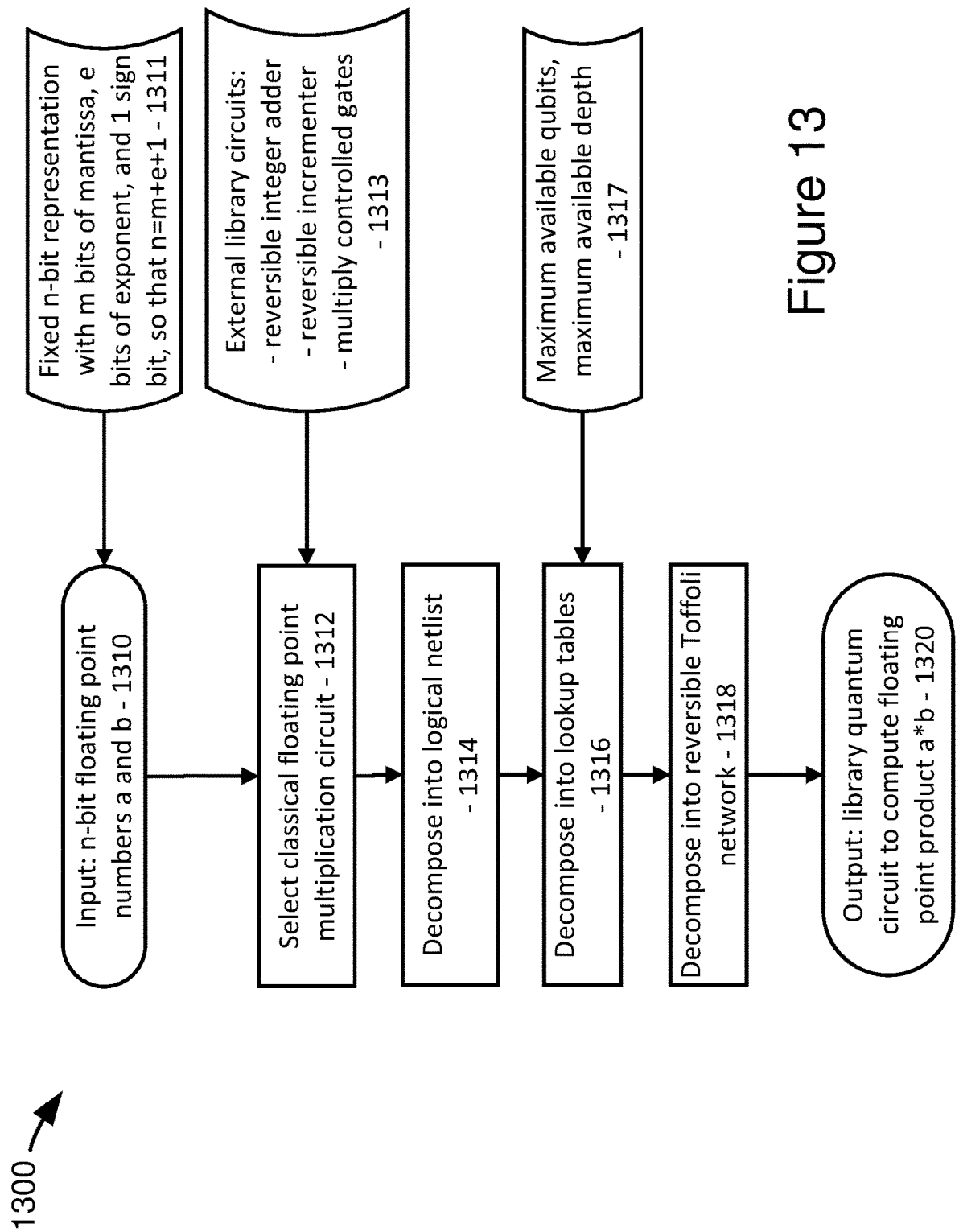
FIG. 13 is a schematic diagram that describes example steps in constructing a floating point multiplier via looking up a precomputed library of circuits.

FIG. 13 is a flowchart 1300 illustrating an example method for performing a library circuit lookup for a floating point multiplier via a lookup of precomputed library circuits. In particular, FIG. 13 is a flowchart 1300 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. Still further, the identified operations need not be performed by a single software module, but can be implemented using multiple modules or software tools, which collectively perform the illustrated method.

Figure 14:
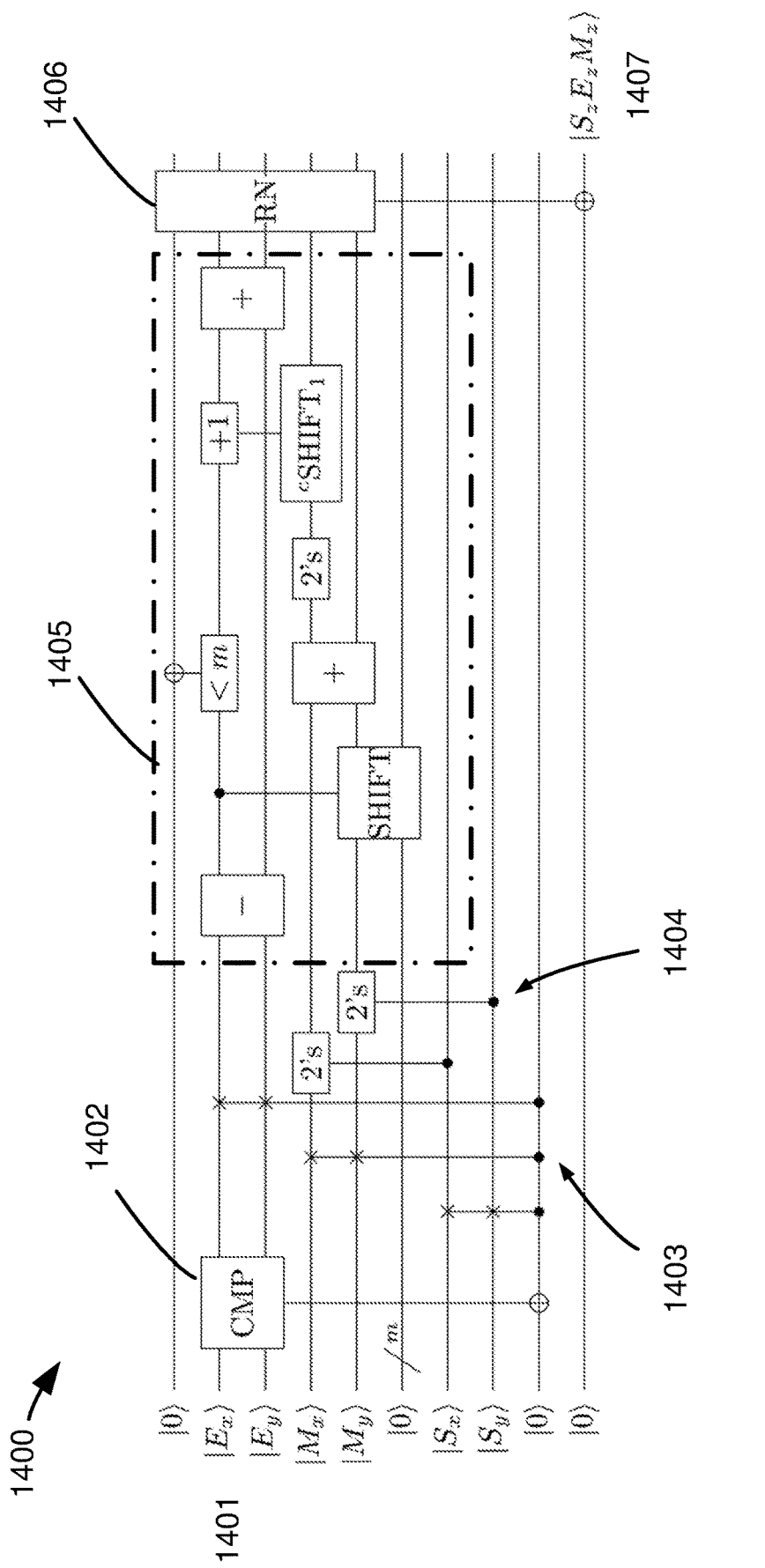
FIG. 14 is a schematic diagram that gives a high-level view of a hand-generated floating point addition circuit.

FIG. 14 is a schematic diagram 1400 that gives a high-level view of a hand-generated floating point addition circuit. First, the inputs 1401 are sorted by the exponent (comparison 1402 followed by controlled swaps 1403 followed by controlled doublers 1404). Then, the second mantissa is shifted by the difference of the exponents before it is added to the first mantissa and converted back from two's complement (taking the pseudo-sign bit as the new sign bit). If there was a final carry in the addition, the result is shifted by 1 bit and the exponent is incremented by 1. This is accomplished by the sequence of gates shown as a dashed box 1405. The final RN gate 1406 renormalizes the intermediate result using the first-ones circuit followed by shifting the mantissa by the output of the first-ones circuit and copies out the resulting floating-point representation, taking care of zero and infinity outcomes. Finally, the output 1407 is produced.

Figure 15:
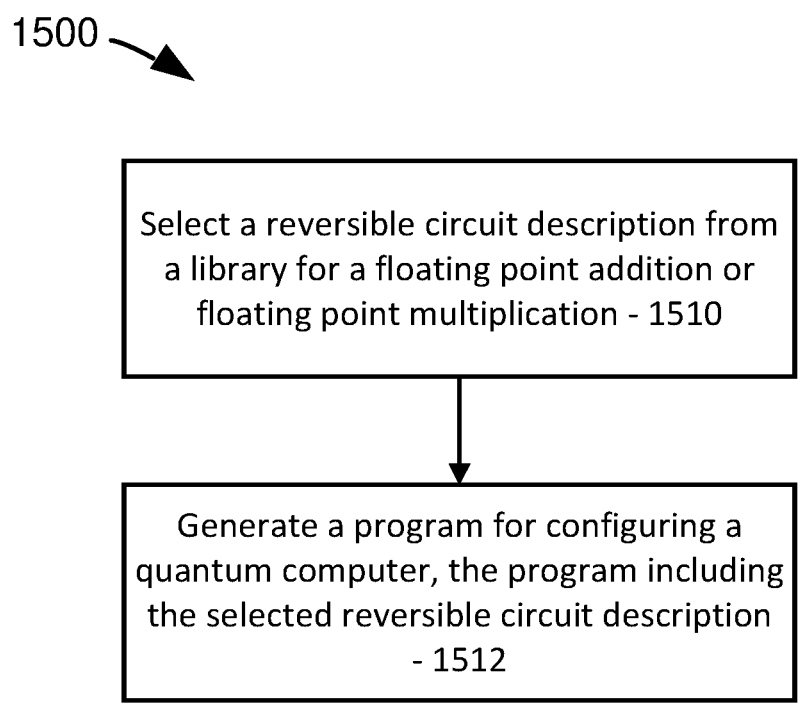
FIG. 15 is a flowchart showing a generalized example embodiment for implementing an embodiment of the disclosed technology.

FIG. 15 is a flowchart 1500 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. Still further, the identified operations need not be performed by a single software module, but can be implemented using multiple modules or software tools, which collectively perform the illustrated method.

At 1510, a reversible circuit description is selected from a library for a floating point addition or floating point multiplication.

At 1512, a program for configuring a quantum computer is generated, the program including the selected reversible circuit description.

In certain embodiments, the library includes multiple floating point adders thereby allowing a tradeoff between circuit parameters. In some embodiments, a number computed by the selected reversible circuit description is split into m bits of mantissa, e bits of exponent, and 1 sign bit, and wherein m can be an arbitrary non-negative integer and wherein e can be an arbitrary non-negative integer that can be chosen independently of m. In certain embodiments, the addition operation is implemented by computing the difference in exponents using a reversible circuit followed by an aligning of the mantissas by the difference followed by adding the mantissas, followed by a reversible test for overflows, and if needed, followed by a shift of the exponent. In some embodiments, the selected reversible circuit description is for floating point addition, and the floating point addition is performed with respect to twos complement encoding. In certain embodiments, the selected reversible circuit description is for floating point multiplication, and the multiplication is implemented by determining a result exponent by adding the factors exponents, followed by multiplying mantissas in an 2m bit register, followed by a test for overflows. Further, in some embodiments, the method further comprises a renormalization of the result.

FIG. 16 is a flowchart 1600 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. Still further, the identified operations need not be performed by a single software module, but can be implemented using multiple modules or software tools, which collectively perform the illustrated method.

At 1610, a reversible circuit for floating point addition or multiplication operations from given classical circuit descriptions is generated (e.g., automatically generated). The reversible circuits can be implementable on a quantum computing device as disclosed herein.

In particular embodiments, the floating point addition or multiplication is performed using encoded operations on the underlying physical quantum computing device (e.g., a fault-tolerant quantum computing device).

In some embodiments, the generating comprises selecting a reversible circuit description from a library of multiple functions. In particular implementations, the selecting is made at compilation time, and in other implementations, the selecting is made at run-time.

In further embodiments, the underlying physical quantum computing device has boundary constraints, including a total number of available qubits, a maximum number of available gates, and a maximum available circuit depth. In some embodiments, the addition and multiplication operations are obtained from classical circuit language descriptions, then decomposed into logical netlists Still further, the netlist can be decomposed into lookup tables, and finally mapped into reversible networks. In some embodiments, the decomposition of the lookup tables into reversible networks is done using optimized circuits for implementing multiply controlled NOT circuits. In certain embodiments, the multiply controlled NOT circuits are mapped into sequences of Toffoli gates using available resources, including available clean or dirty ancillas.

Figure 17:
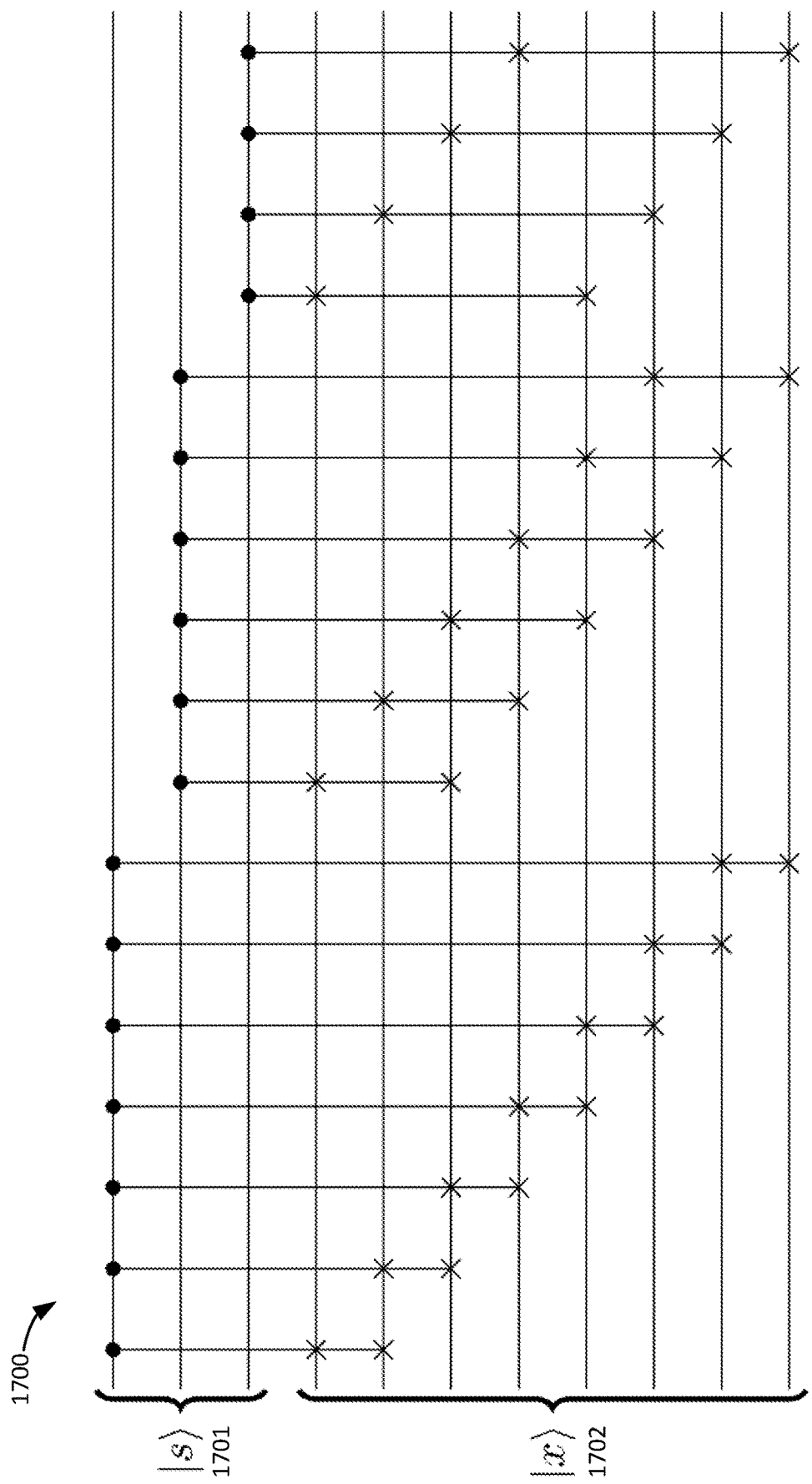
FIG. 17 illustrates an example implementation of a shift circuit for an 8-bit number and a 3-bit encoding of the shift.

FIG. 17 illustrates an implementation of a shift circuit for an 8-bit number x 1702 and a 3-bit encoding of the shift 1701. Modifications of this circuit enable shifts in both directions and to ensure that the sign bit is copied when right-shifting a negative number in two's complement.

Figure 18:
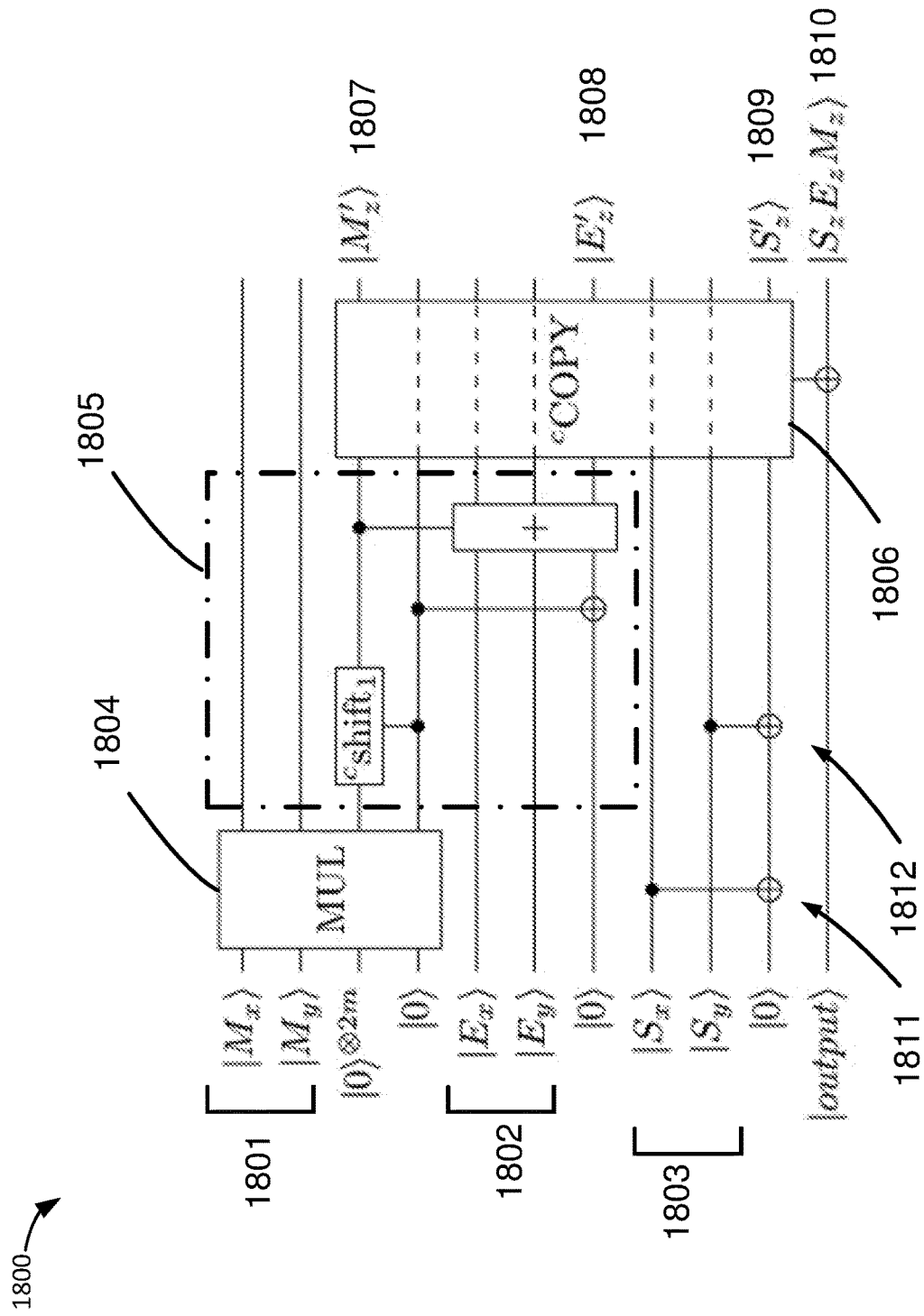
FIG. 18 is a high-level view of a hand-generated floating point multiplication circuit.

FIG. 18 is a high-level view of a hand-generated floating point multiplication circuit. After multiplying 1804 the input mantissas $M_x$ and $M_y$ 1801 into a new register of 2m qubits (m denotes the number of mantissa bits), it is right-shifted by one if the resulting mantissa $M_x \cdot M_y \geq 2$. The exponent is updated accordingly (using a CNOT), followed by an addition of both input exponents $E_x$ and $E_y$ 1802 into $E_z'$ 1808 (if $M_x \cdot M_y \neq 0$). This is accomplished using the gates shown in the dashed box 1805. Output sign bit is computed from the input sign bits $S_x$ and $S_y$ 1803. This is done by applying the CNOT gates 1811 and 1812. The final step denoted by $^c$COPY 1806 consists of conditionally copying out of the resulting exponent 1807, mantissa 1808 and sign bit 1809 to take care of special cases such as over- and underflows in computing the resulting exponent which turn to infinity and zero outcomes, respectively. The final output 1810 is returned at the end.

FIG. 19 is a table of resource counts for hand-generated generated circuits 1900.

Figure 20:
FIG. 20 is a table of resource counts for automatically generated circuits.

FIG. 20 is a table of resource counts for automatically generated circuits 2000.

Figure 21:
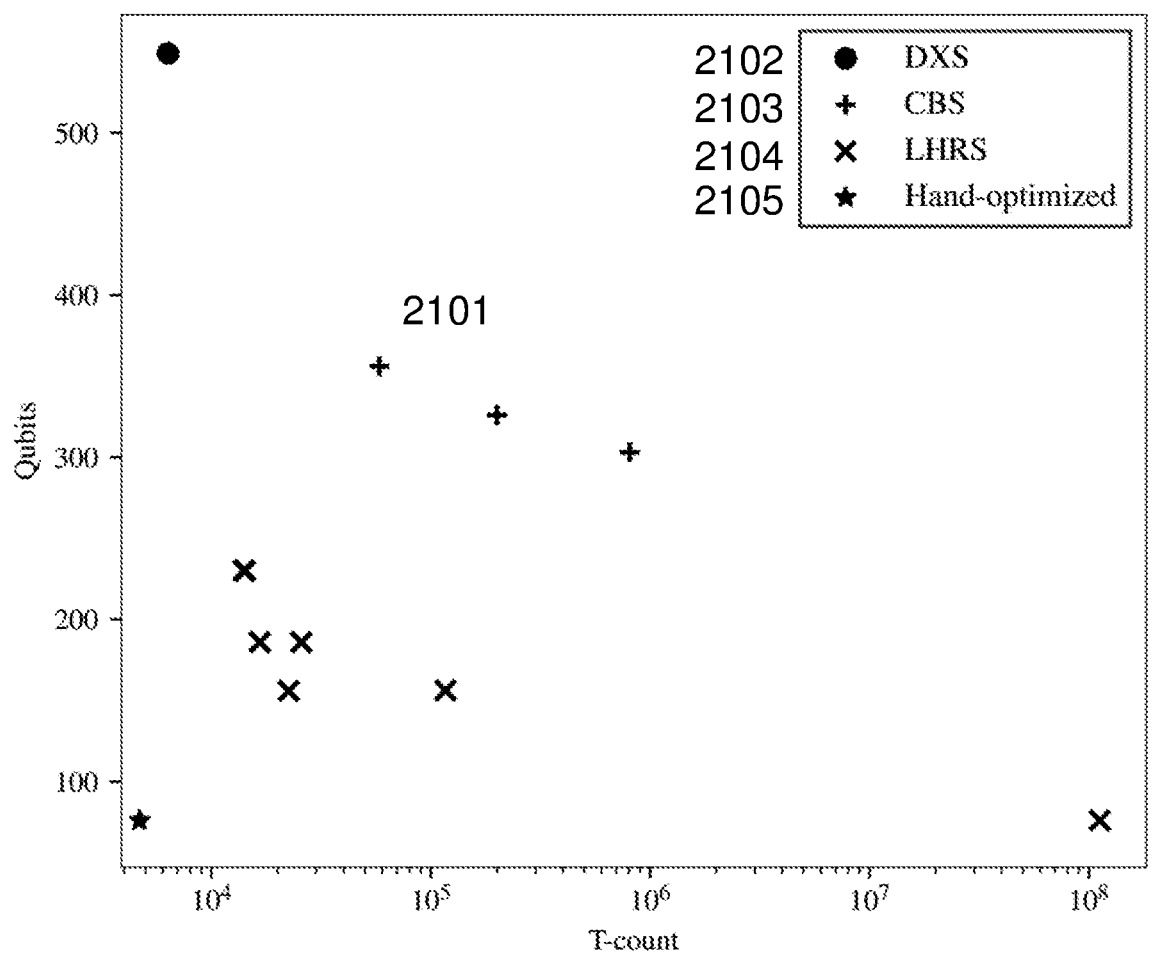
FIG. 21 is a plot of characteristics of different implementations of 16-bit floating point adders.

FIG. 21 is a plot of characteristics of different implementations of 16-bit floating point adders. Each data point 2101 corresponds to characteristics that have been obtained by applying a different method for obtaining the floating point addition circuit, including XMG-based synthesis DXS 2102, circuit-based synthesis CBS 2103, lookup-table based synthesis LHRS 2104, and hand-generated circuits 2105.

XI. Appendix

The Appendix below shows example code for implementing aspects of the disclosed technology. In particular, the Appendix is a reference implementation of floating point arithmetic in LIQUi|⟩, which is an embedded language in the .NET programming language F#. As discussed, a floating point library was implemented that can be instantiated for any desired bit-size (e.g., any number of mantissa bits and exponent bits for the representation of the floating point numbers). The library constructs quantum circuits over the Toffoli gate sets. These can then be mapped to other universal quantum gate sets, where a preferred embodiment is the Clifford+T gate set.

XII. Concluding Remarks

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A computer-implemented method, comprising:
   selecting a reversible circuit description from a library for a floating point multiplication; and
   generating a program for configuring a quantum computer including the selected reversible circuit description.

2. The method of 1, wherein a number computed by the selected reversible circuit description is split into m bits of mantissa, e bits of exponent, and 1 sign hit, and wherein m, can be an arbitrary non-negative integer and wherein e can be an arbitrary non-negative integer that can be chosen independently of m.

3. The method of 1, wherein the selected reversible circuit description is for floating point multiplication, and wherein the floating point multiplication is implemented by determining a result exponent by adding exponents, followed by multiplying mantissas in a 2 m bit register, followed by a test for overflows.

4. The method of 3, wherein the method further comprises a renormalization of the result.

5. A system, comprising:
   a processing device; and
   one or more storage devices storing computer-implementable instructions, which when implemented by the processing device, automatically generate reversible circuits for floating point multiplication operations from given classical circuit descriptions.

6. The system of claim 5, further comprising a quantum computing device configured to implement the reversible circuits.

7. The system of claim 5, wherein tine floating point multiplication is performed using encoded operations on an underlying physical quantum computing device.

8. The system of claim 7, wherein the underlying physical quantum computing device is a fault-tolerant quantum computing device.

9. The system of claim 5, wherein the generating comprises selecting a reversible circuit description from a library of multiple functions.

10. The system of claim 9, wherein the selecting is performed at compilation time.

11. The system of 9, wherein the selecting is performed at run-time.

12. The system of 7, wherein the underlying physical quantum computing device has boundary constraints, including a total number of available qubits, a maximum number of available gates, and a maximum available circuit depth.

13. The system of 9, wherein the floating point multiplication operations are obtained from classical circuit language descriptions, then decomposed into logical netlists.

14. The system of 13, where the netlist is further decomposed into lookup tables, and finally mapped into reversible networks.

15. The system of 14 where the decomposition of the lookup tables into reversible networks is done using optimized circuits for implementing multiply controlled NOT circuits.

16. The system of 15 where the multiply controlled NOT circuits are mapped into sequences of Toffoli gates using available resources, including available dean or dirty ancillas.

17. One or more storage devices storing computer-implementable instructions, which when implemented by a processing device, automatically generate reversible circuits for floating point multiplication operations from given classical circuit descriptions.

\* \* \* \* \*